(12) United States Patent
Kaneda

(10) Patent No.: US 10,288,774 B2
(45) Date of Patent: May 14, 2019

(54) ILLUMINATION DEVICE AND DISPLAY UNIT

(71) Applicant: Sony Corporation, Tokyo (JP)

(72) Inventor: Kazumasa Kaneda, Kanagawa (JP)

(73) Assignee: Sony Corporation, Tokyo (JP)

( * ) Notice: Subject to any disclaimer, the term of this patent is extended or adjusted under 35 U.S.C. 154(b) by 473 days.

(21) Appl. No.: 14/389,577

(22) PCT Filed: Jan. 16, 2014

(86) PCT No.: PCT/JP2014/000178
§ 371 (c)(1),
(2) Date: Sep. 30, 2014

(87) PCT Pub. No.: WO2014/119237
PCT Pub. Date: Aug. 7, 2014

(65) Prior Publication Data
US 2015/0055100 A1    Feb. 26, 2015

(30) Foreign Application Priority Data

Jan. 30, 2013   (JP) .................................. 2013-015393

(51) Int. Cl.
*G02B 3/00*       (2006.01)
*G02B 27/09*      (2006.01)
(Continued)

(52) U.S. Cl.
CPC ............ *G02B 3/0043* (2013.01); *F21V 5/045* (2013.01); *G02B 3/0056* (2013.01);
(Continued)

(58) Field of Classification Search
CPC .......................... G02B 3/0043; G02B 3/0056
(Continued)

(56) References Cited

U.S. PATENT DOCUMENTS 5,594,526 A * 1/1997 Mori .................... G02B 3/0056
359/620
6,062,695 A * 5/2000 Kakuda ................ G02B 27/283
348/E9.027
(Continued)

FOREIGN PATENT DOCUMENTS

EP          0563874       10/1993
EP          0867734       9/1998
(Continued)

OTHER PUBLICATIONS

International Search Report issued in connection with International Patent Application No. PCT/JP2014/000178, dated Jun. 20, 2014. (6 pages).

*Primary Examiner* — Zachary W Wilkes
(74) *Attorney, Agent, or Firm* — K&L Gates LLP

(57) ABSTRACT

An optical member is provided including a substrate, and a plurality of sub-regions two-dimensionally arranged on the substrate. Each of the sub-regions includes a plurality of unit lenses. The sub-regions and unit lenses are configured to spatially divide an incident light flux into a plurality of light fluxes according to the arrangement of the sub-regions while partially superimposing said divided light fluxes onto one another. Also, each of the sub-regions includes a plurality of the unit lenses arranged in a two-dimensional array, and each of the unit lenses has shape anisotropy.

18 Claims, 19 Drawing Sheets

(51) Int. Cl.
*G02B 21/20* (2006.01)
*G03B 33/06* (2006.01)
*F21V 5/04* (2006.01)
*G03B 21/20* (2006.01)

(52) U.S. Cl.
CPC ....... *G02B 3/0062* (2013.01); *G02B 27/0905* (2013.01); *G02B 27/0961* (2013.01); *G03B 21/208* (2013.01); *G03B 33/06* (2013.01)

(58) Field of Classification Search
USPC .................................................. 359/626, 628
See application file for complete search history.

(56) References Cited

U.S. PATENT DOCUMENTS

| | | | | |
|---|---|---|---|---|
| 6,101,040 | A * | 8/2000 | Itoh | G02B 3/0043 359/621 |
| 8,348,438 | B2 * | 1/2013 | Takauchi | G02B 3/0043 353/102 |
| 2011/0051253 | A1 * | 3/2011 | Mitra | G02B 3/0043 359/641 |
| 2011/0292349 | A1 | 12/2011 | Kitano et al. | |
| 2012/0092624 | A1 | 4/2012 | Oiwa et al. | |

FOREIGN PATENT DOCUMENTS

| | | |
|---|---|---|
| EP | 1873559 | 1/2008 |
| JP | 2002-311382 | 10/2002 |
| JP | 2012-008549 | 1/2012 |
| WO | 2004/027495 | 4/2004 |

* cited by examiner

[Fig. 1]
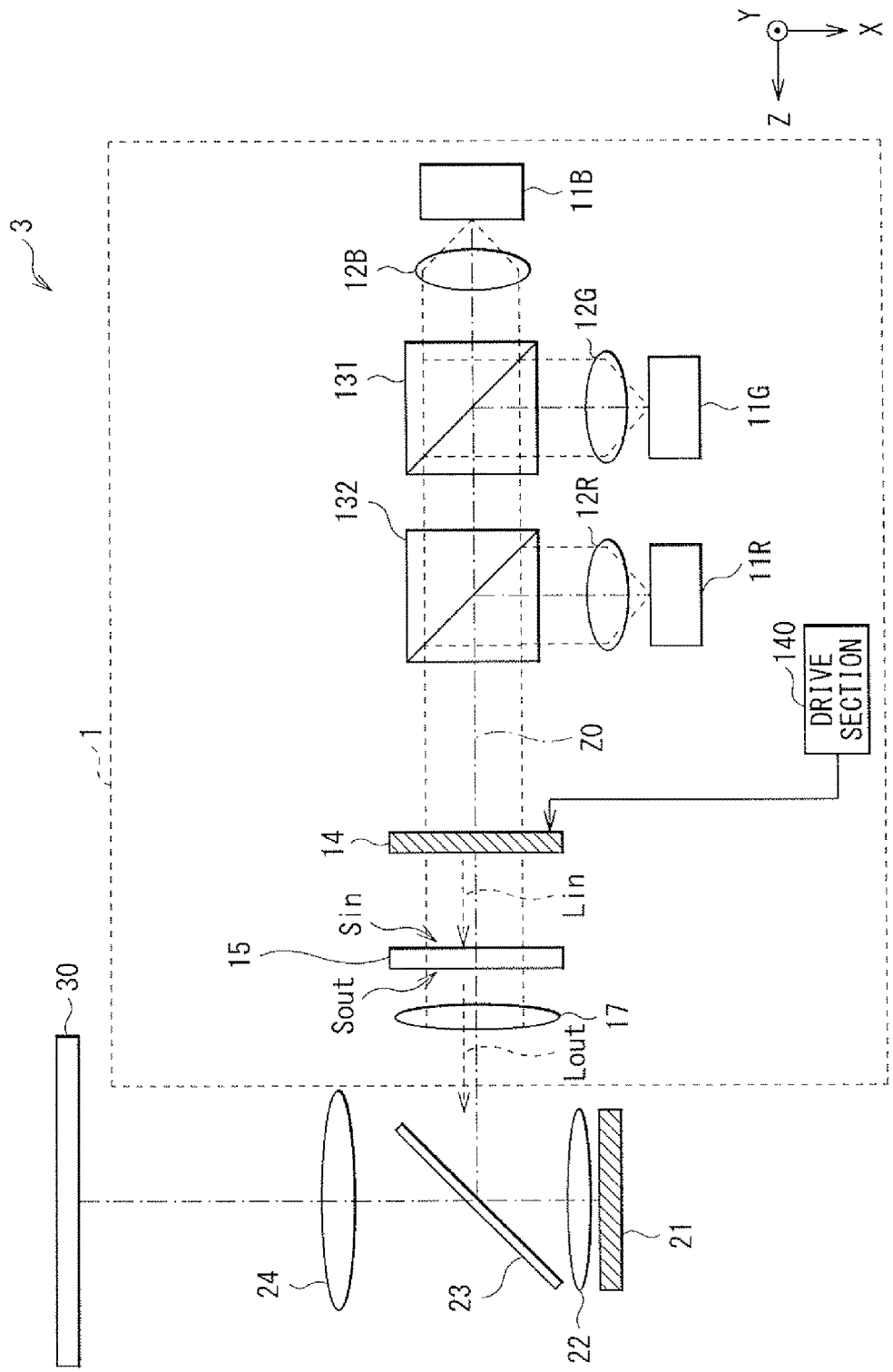

[Fig. 2]
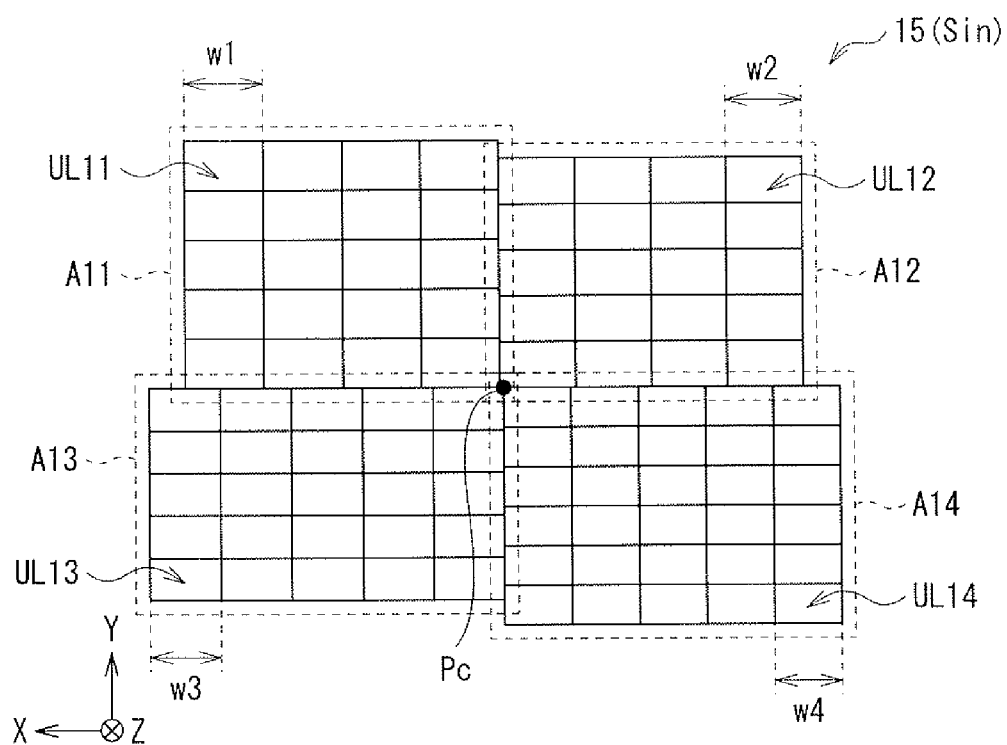
[Fig. 3]
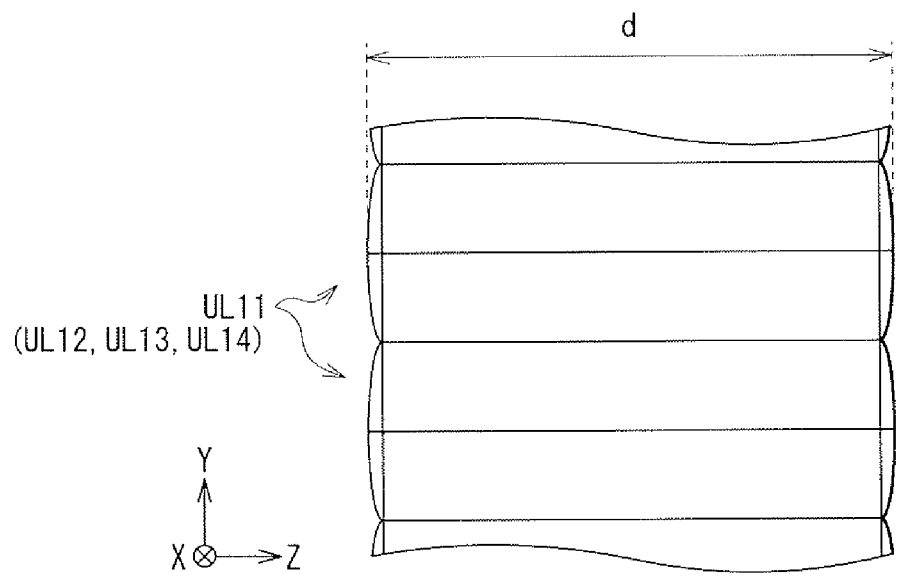

[Fig. 4]
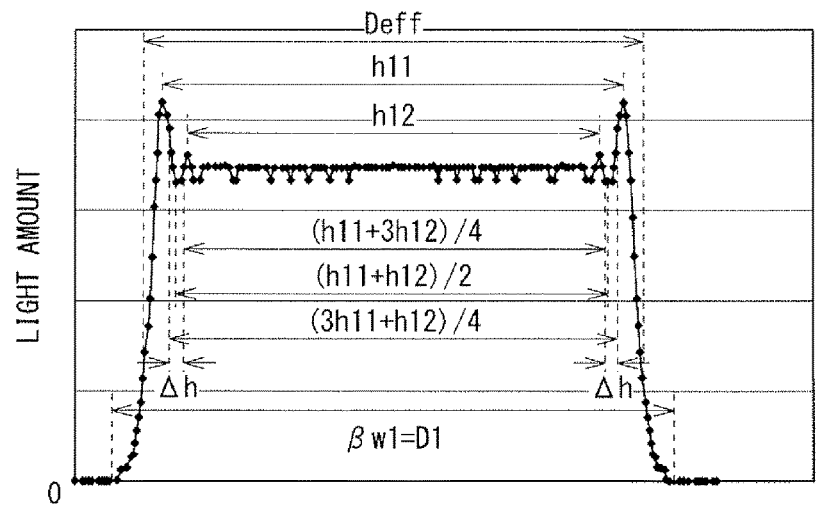
POSITION IN HORIZONTAL DIRECTION ON REFLECTIVE LIQUID CRYSTAL DEVICE 21
[Fig. 5]
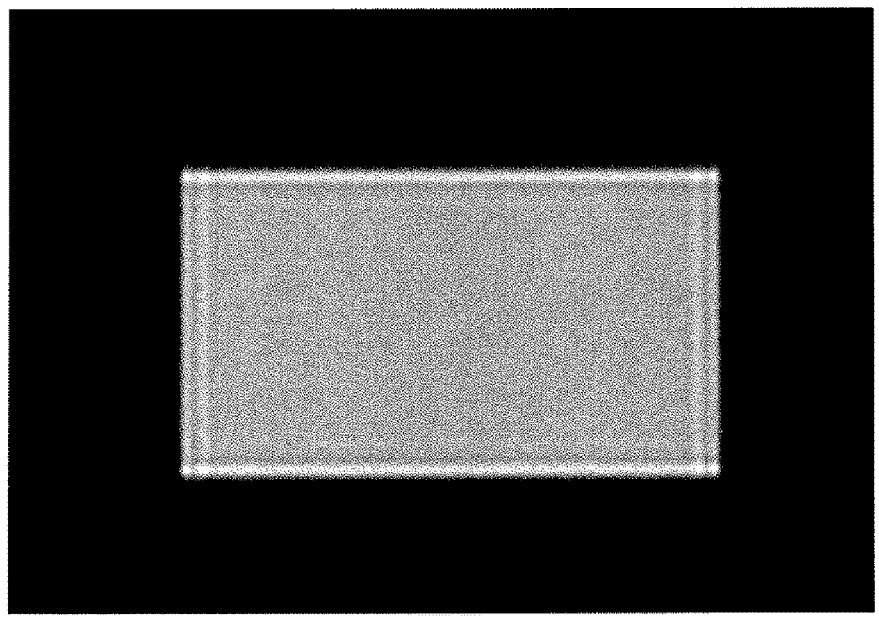

[Fig. 6]
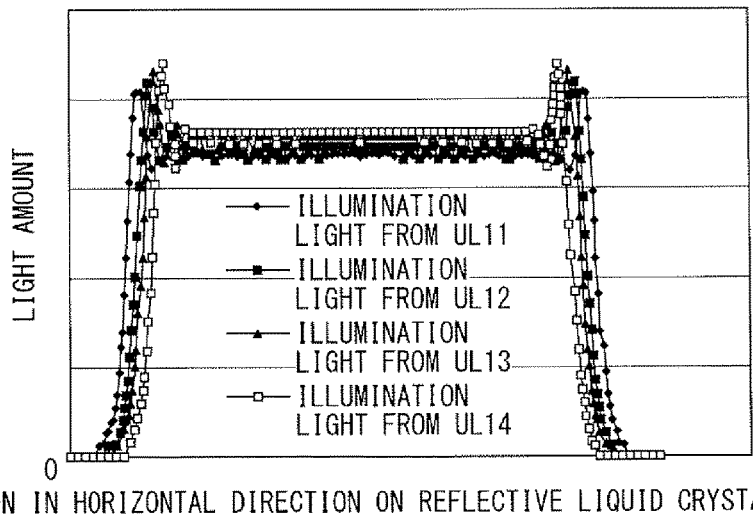
[Fig. 7]
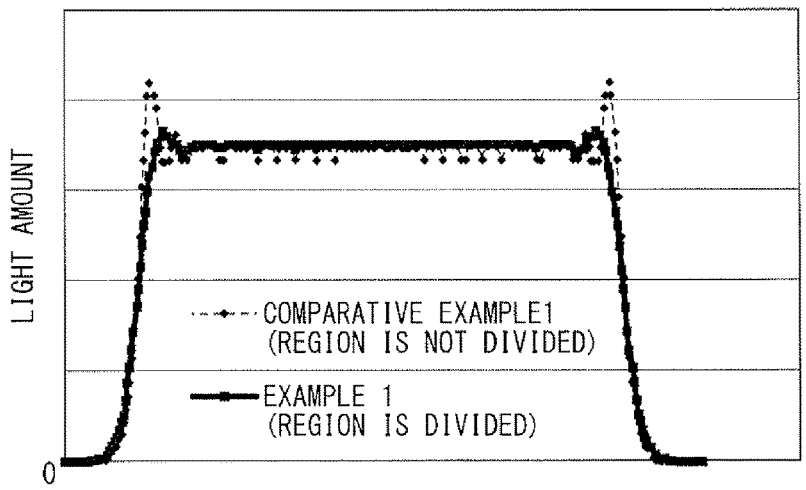

[Fig. 8]
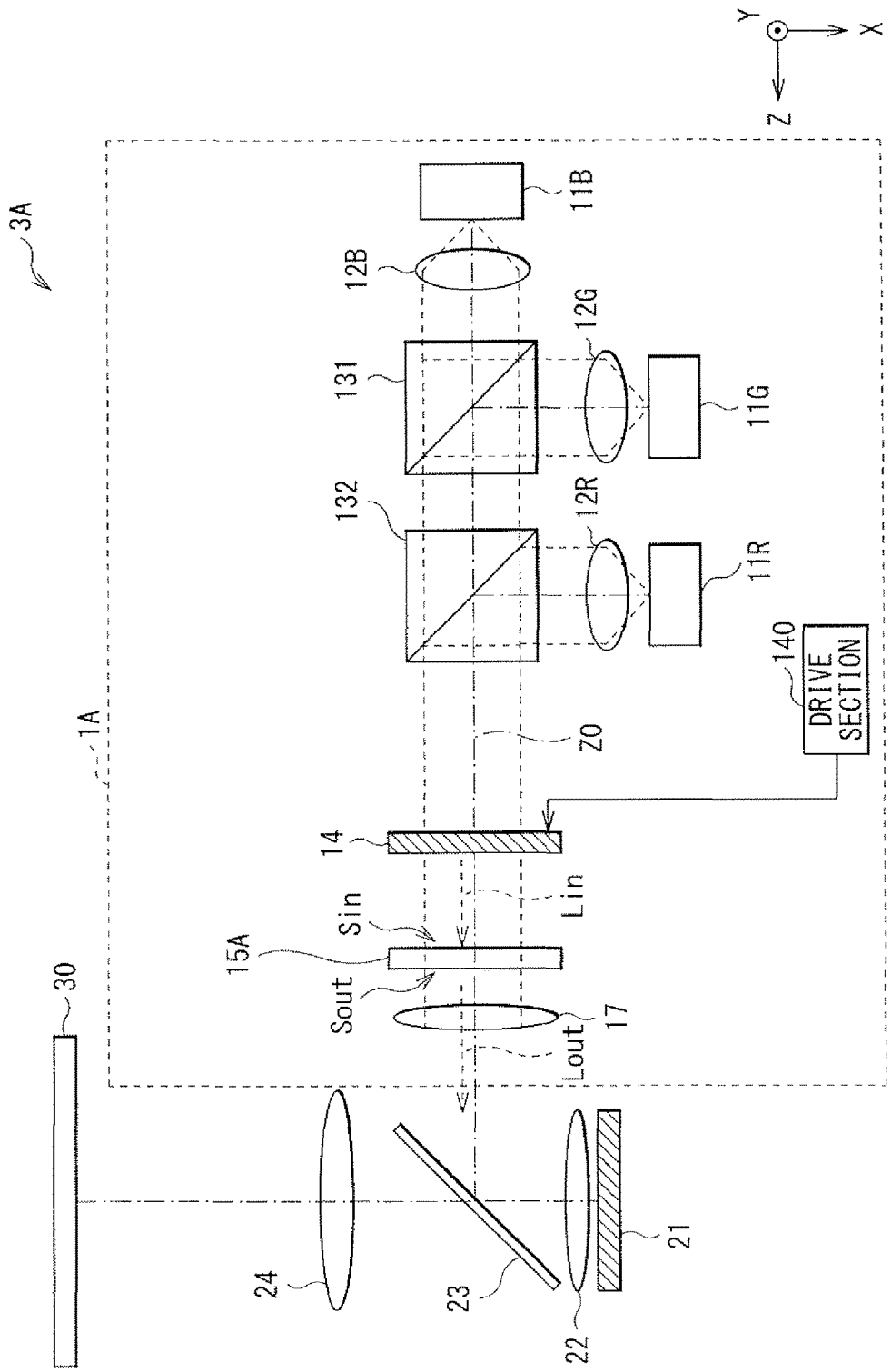

[Fig. 9]
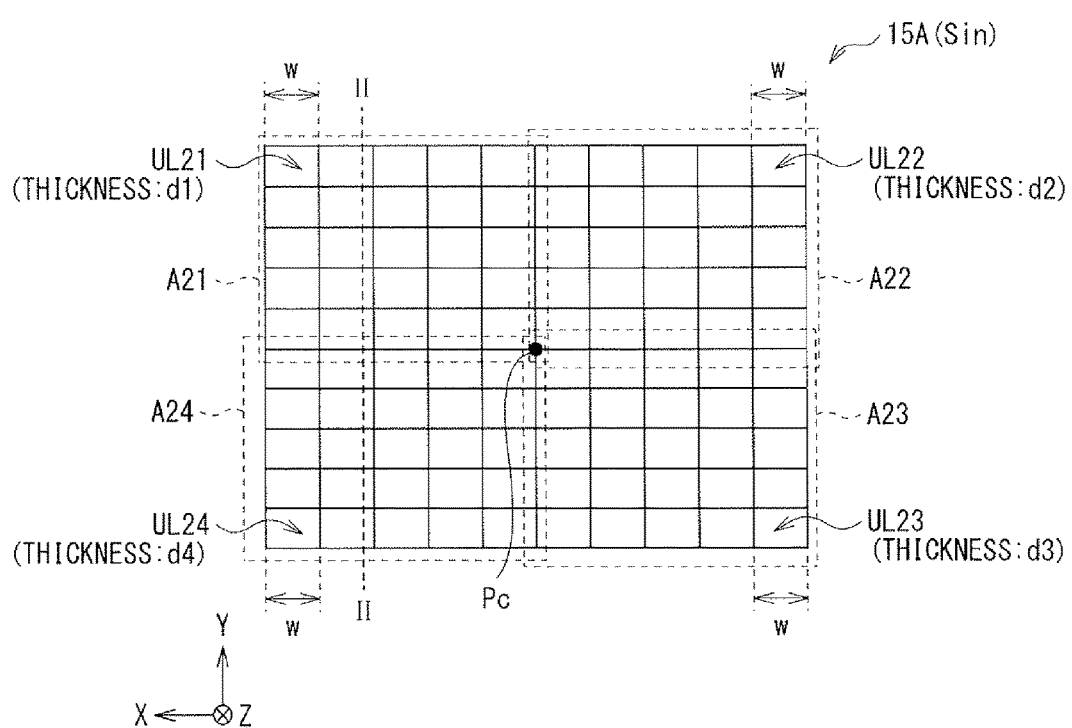

[Fig. 10]
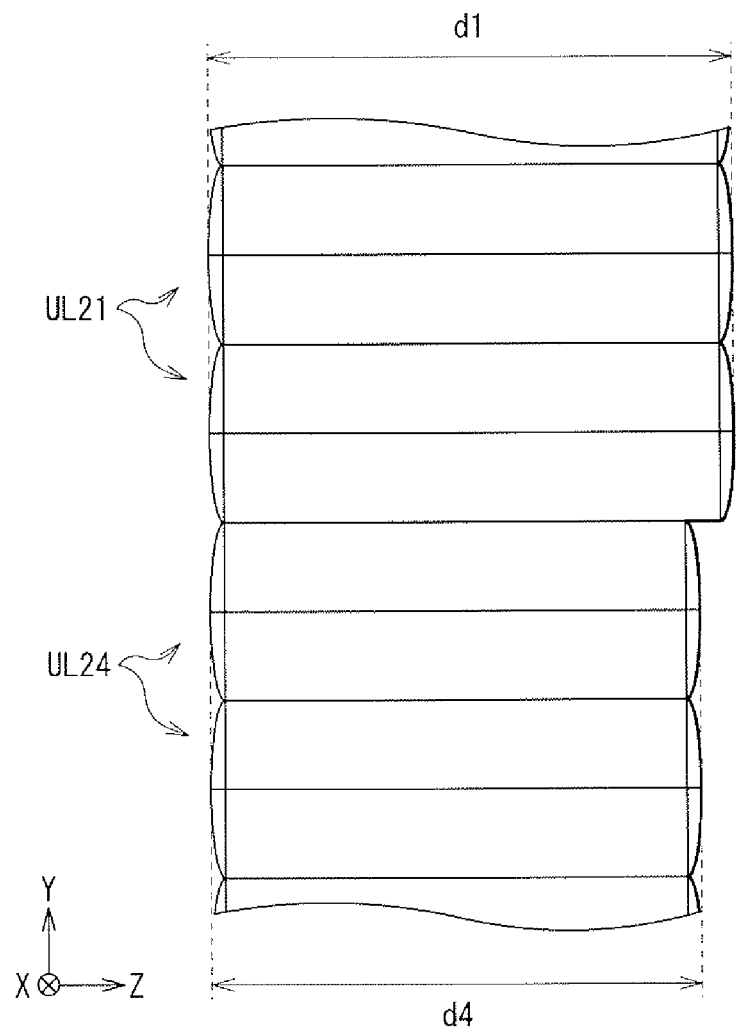

[Fig. 11]
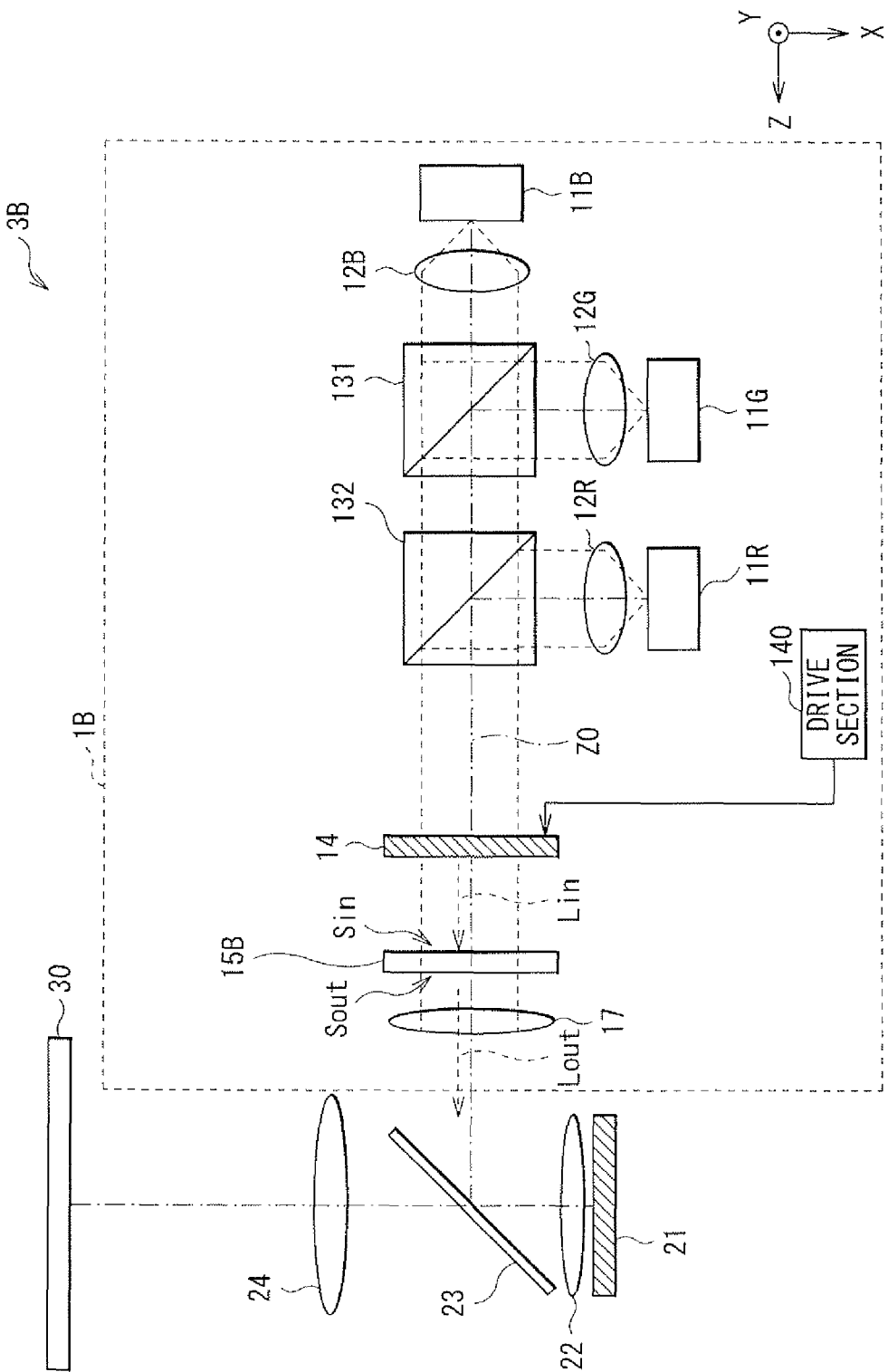

[Fig. 12]
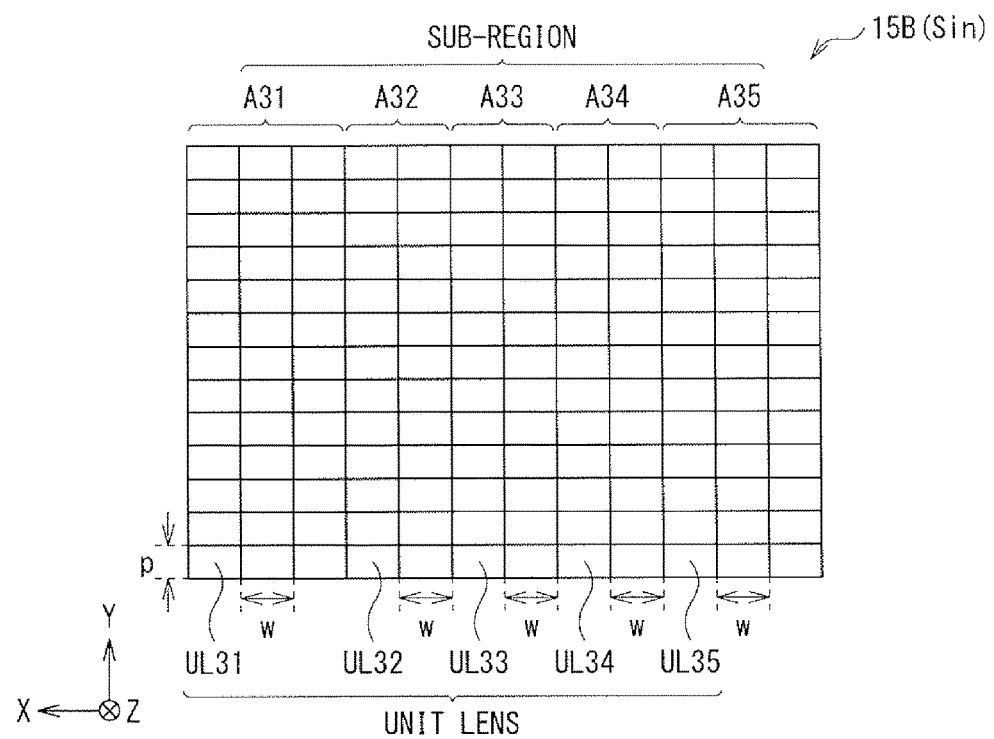
[Fig. 13]
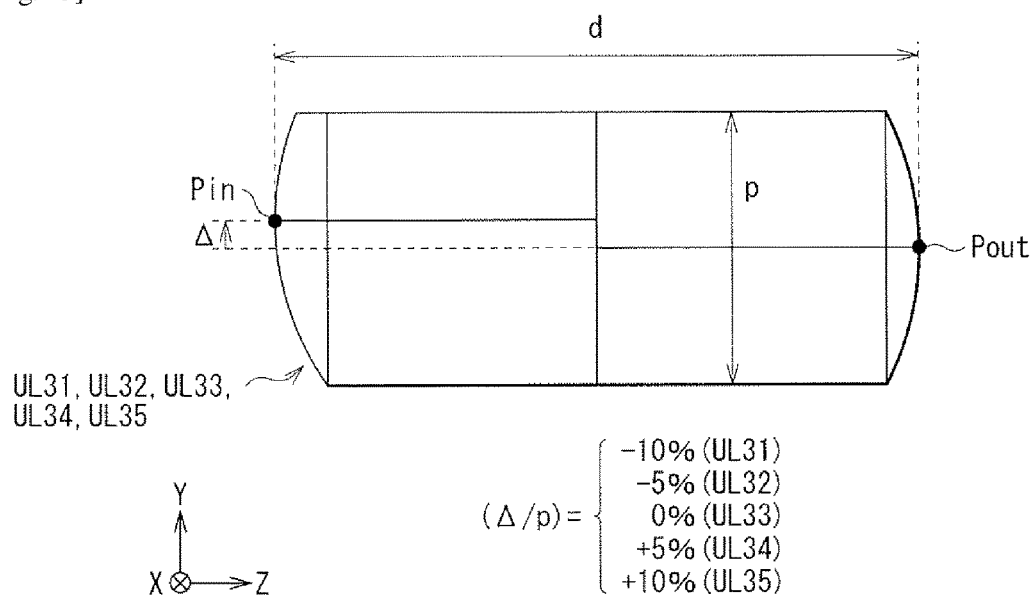

[Fig. 14]
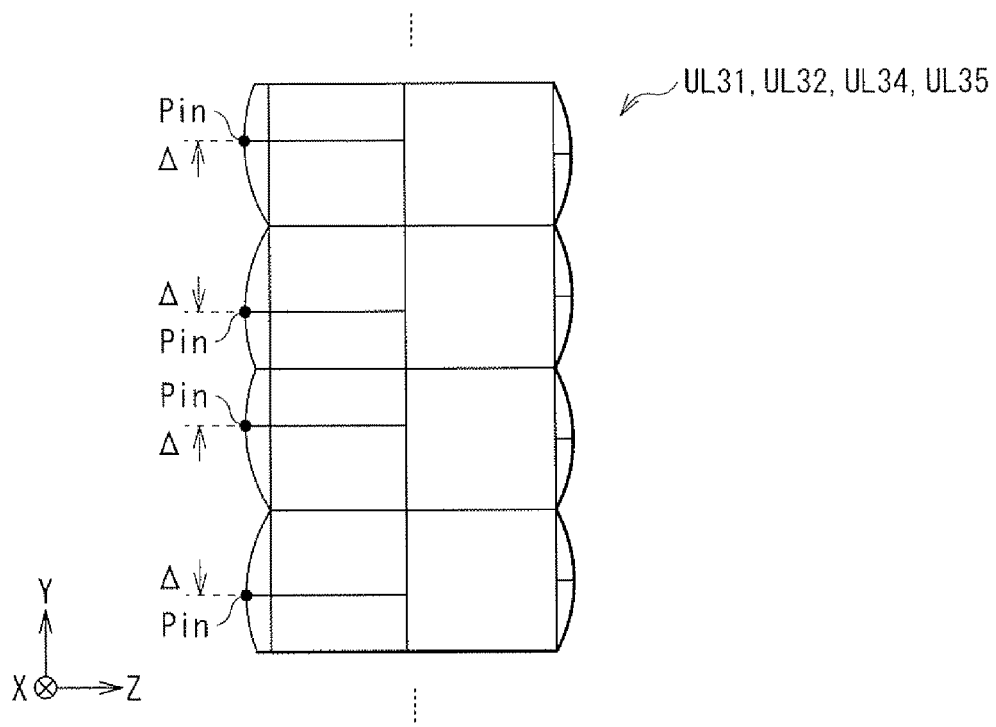

[Fig. 15]
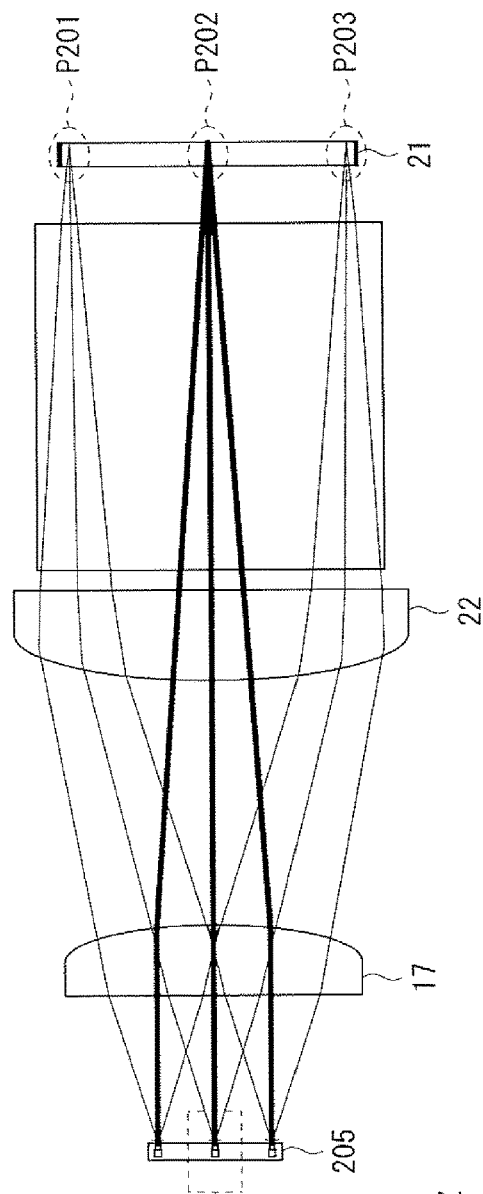
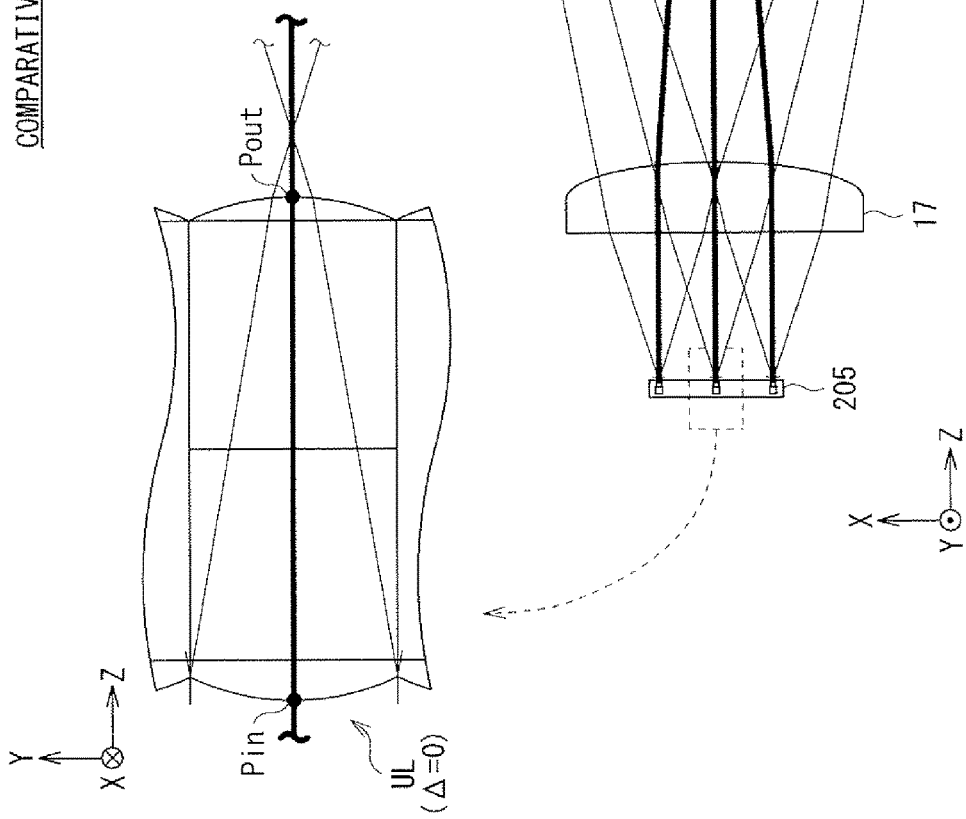

[Fig. 16]
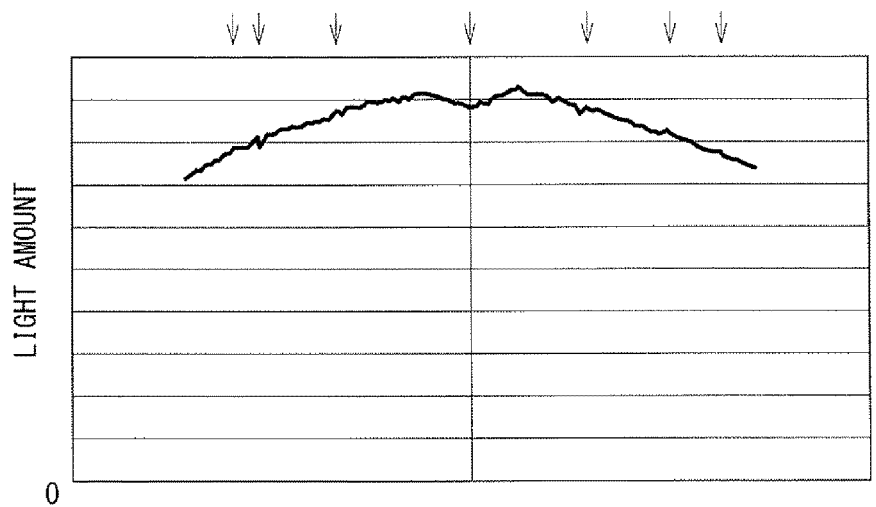
[Fig. 17]
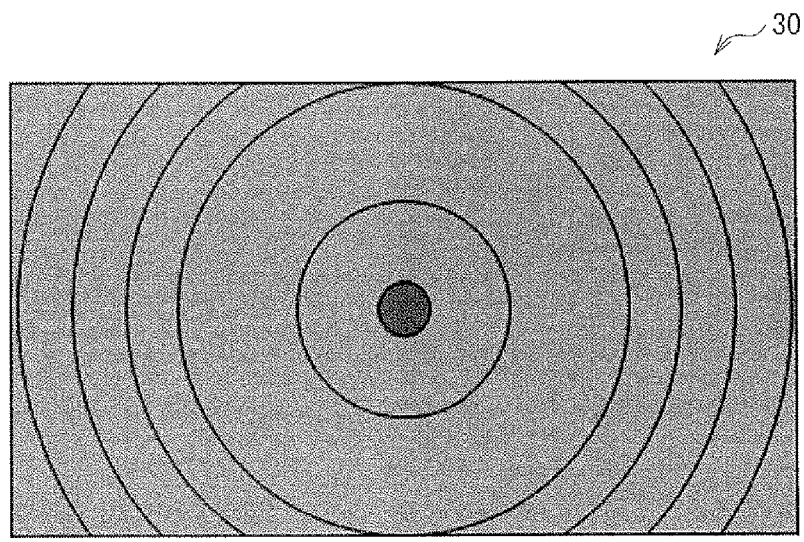

[Fig. 18]
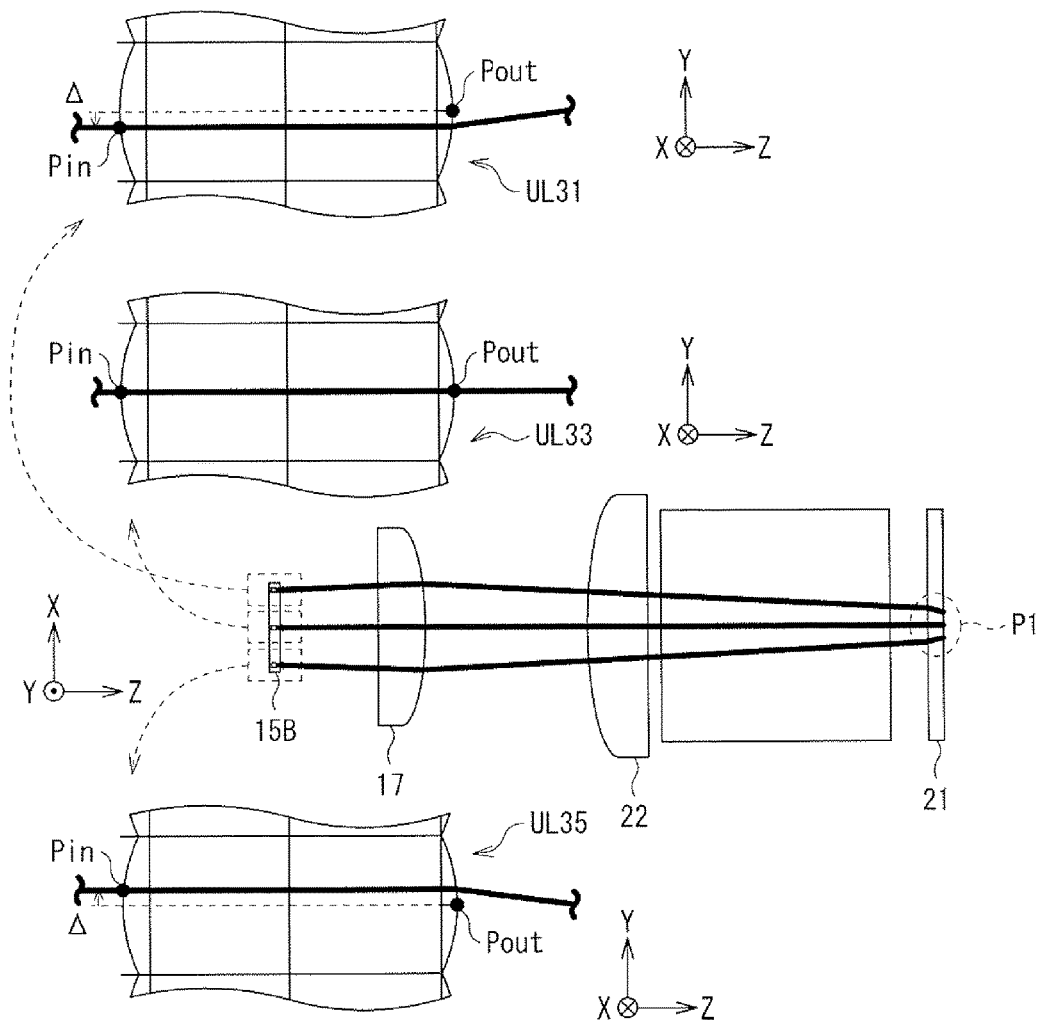

[Fig. 19]
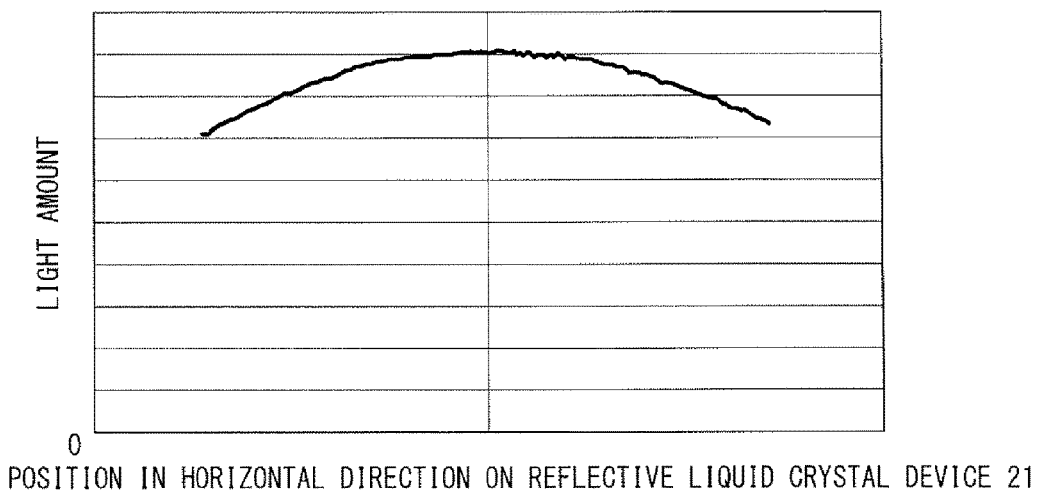

[Fig. 20]
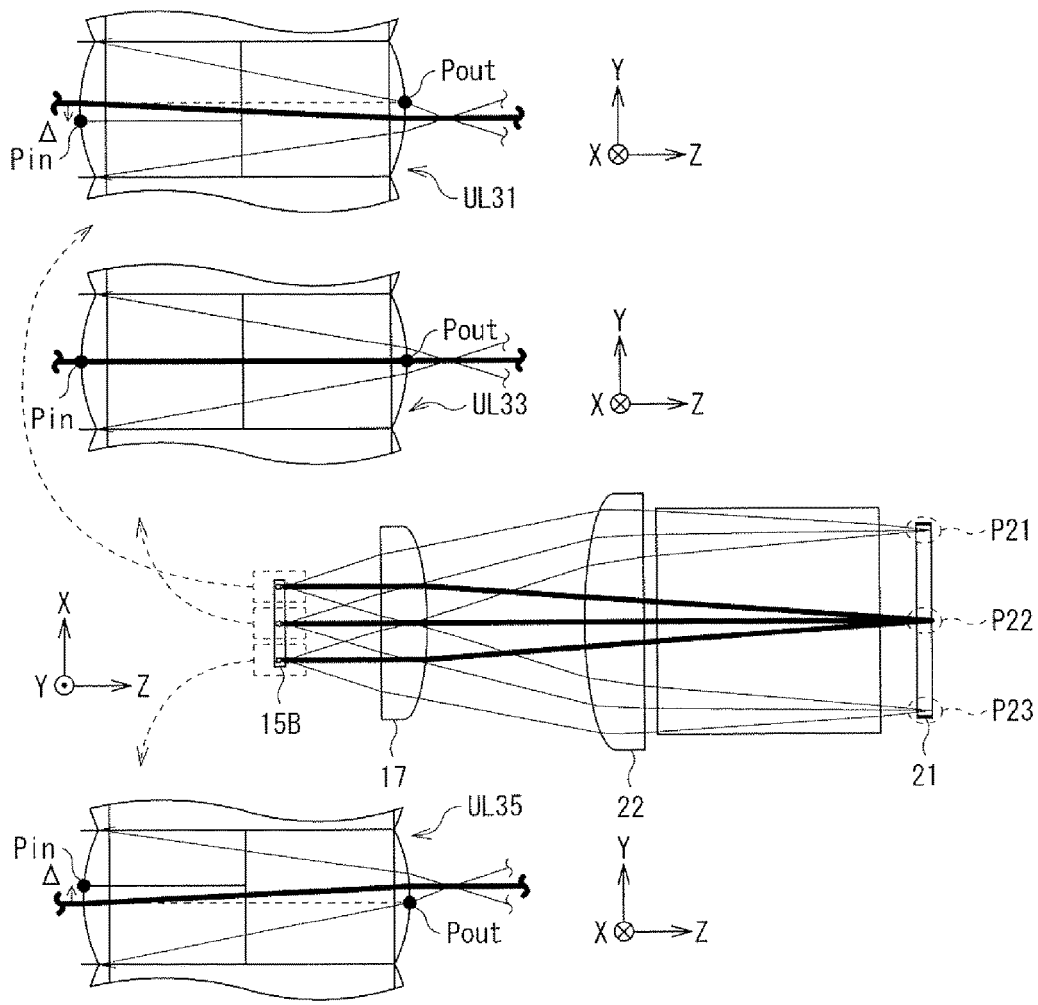

[Fig. 21]
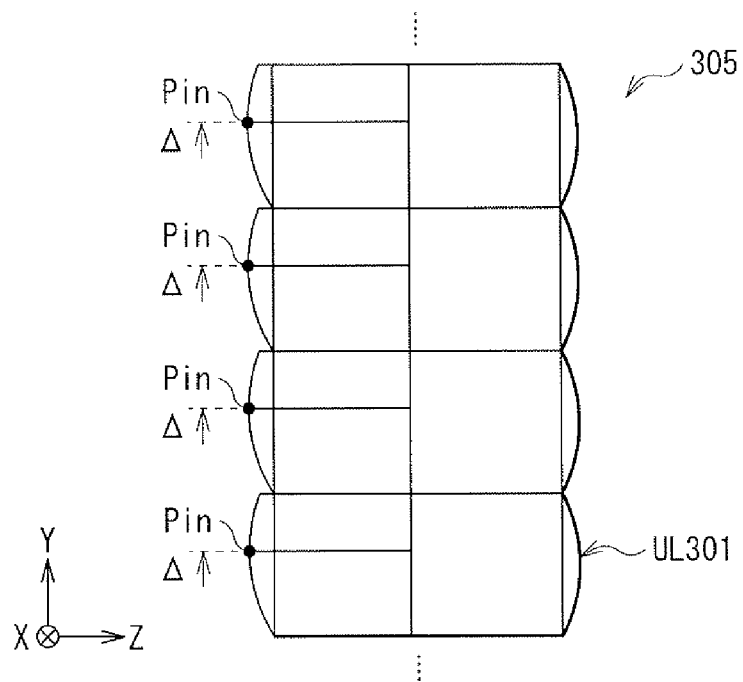
[Fig. 22]
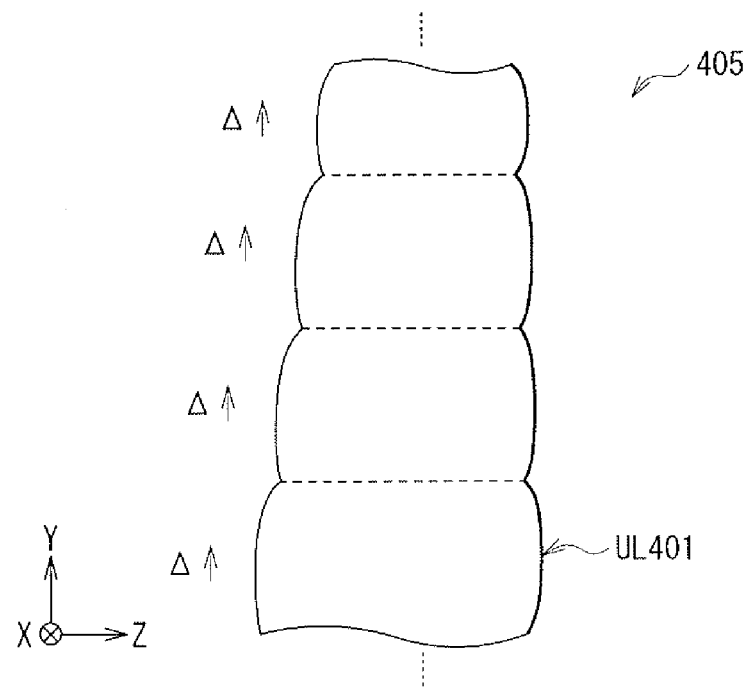

[Fig. 23]
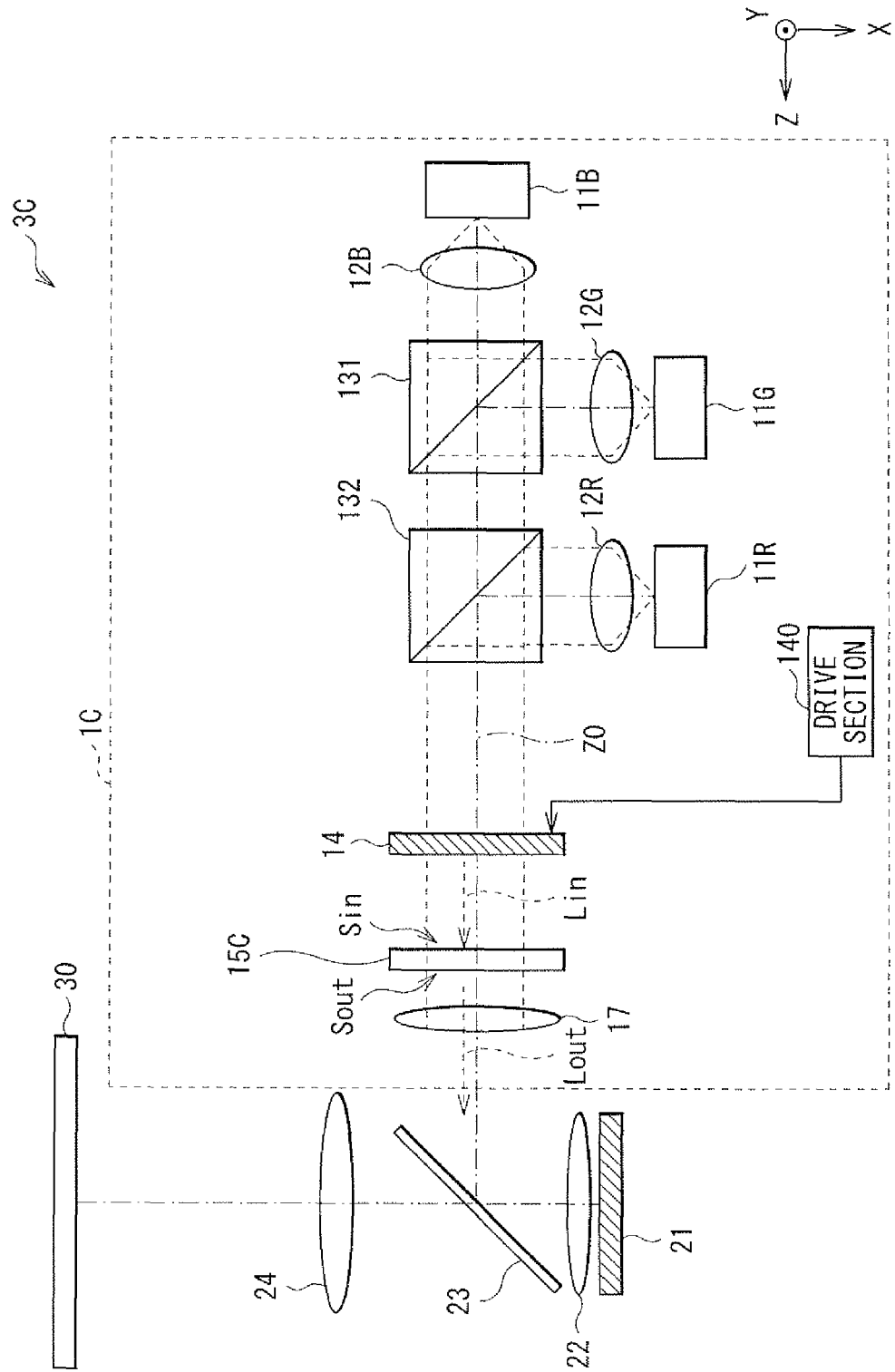

[Fig. 24]
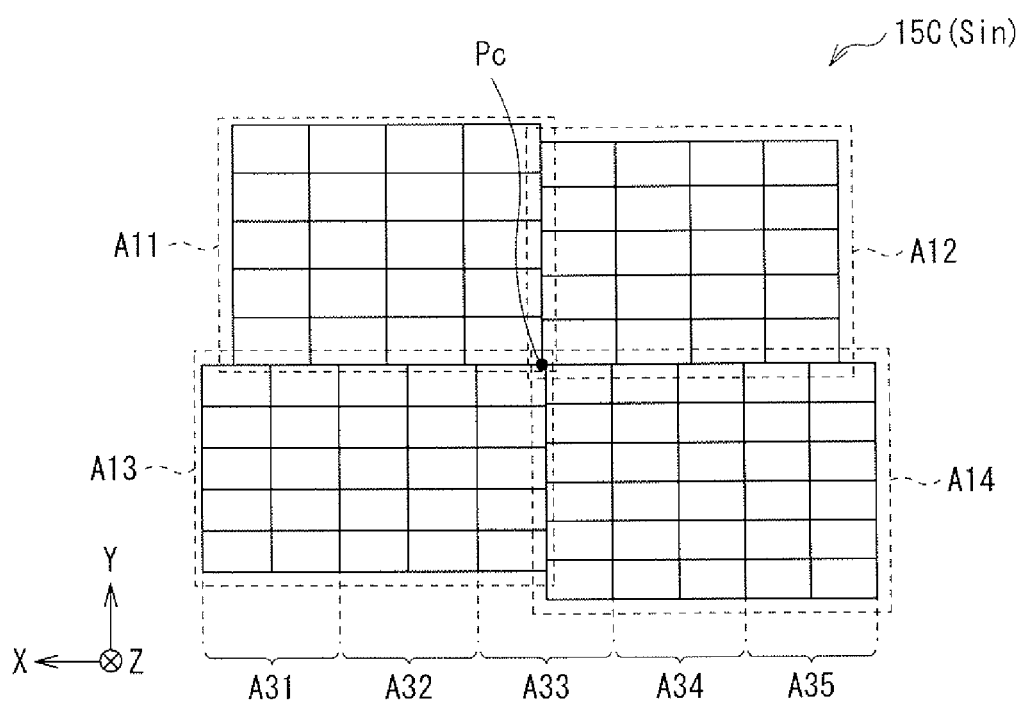

[Fig. 25]
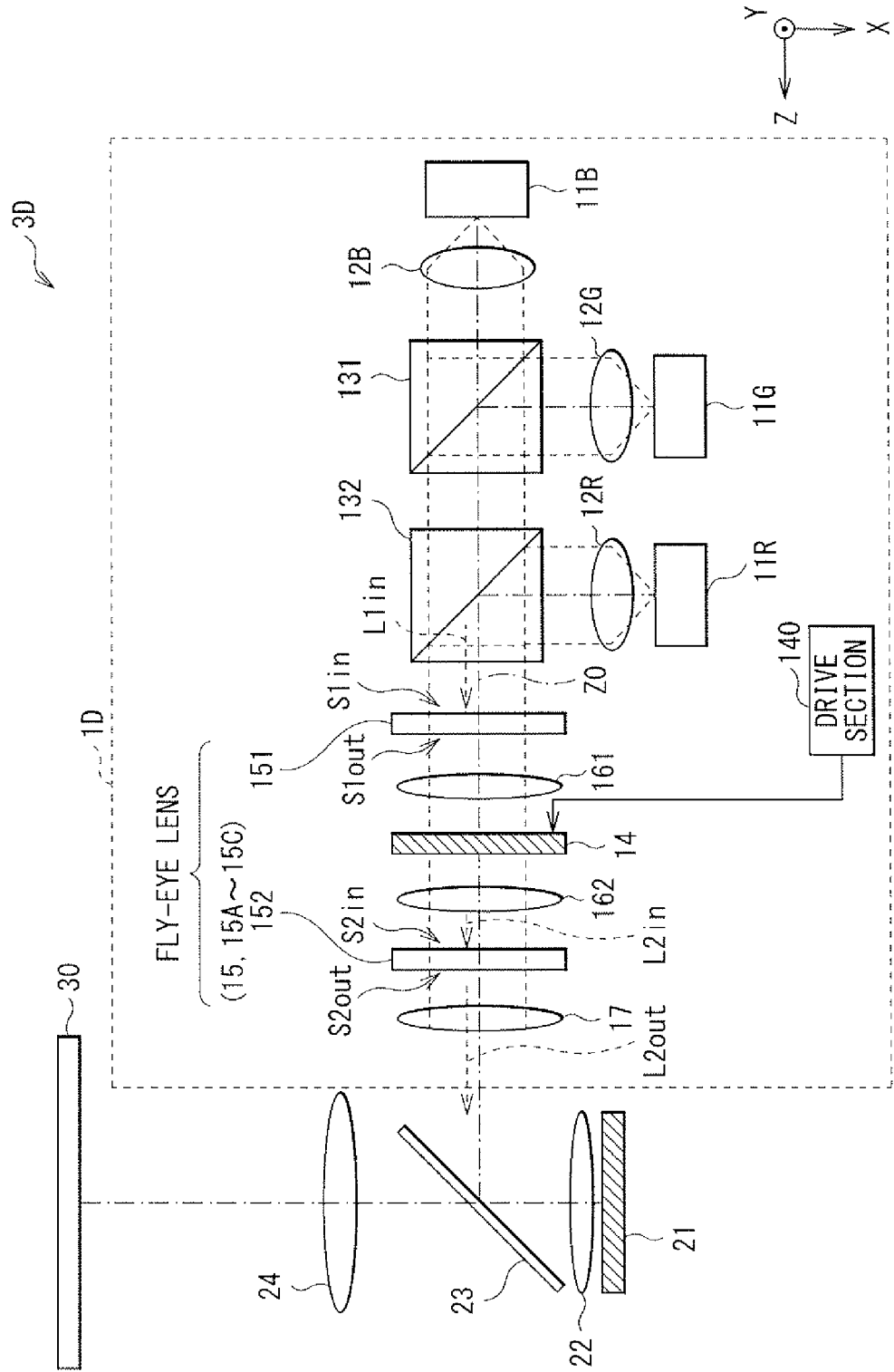

ILLUMINATION DEVICE AND DISPLAY UNIT

CROSS REFERENCES TO RELATED APPLICATIONS

The present application is a national stage of International Application No. PCT/JP2014/000178 filed on Jan. 16, 2014 and claims priority to Japanese Patent Application No. 2013-015393 filed on Jan. 30, 2013, the disclosure of which is incorporated herein by reference.

BACKGROUND

The present disclosure relates to an illumination device emitting illumination light, and a display unit displaying an image with use of such an illumination device.

A typical optical module, which is one of major components in a projector (a projection display unit), is configured of an illumination optical system (an illumination device) including a light source, and a projection optical system including a light modulation device. In the field of such a projector, a small-sized (a palm-sized) lightweight portable projector called "microprojector" has recently become widespread. A typical microprojector mainly uses an LED (Light Emitting Diode) as the light source of the illumination device.

On the other hand, a laser is recently attracting an attention as a new light source of the illumination device. For example, following commercialization of high-power blue laser diodes and high-power red laser diodes, green laser diodes are being developed, and are nearing practical use. Based on such a background, there is proposed a projector using single-color lasers (laser diodes) of three primary colors of red (R), green (G), and blue (B) as light sources of an illumination device. With use of the single-color lasers as the light sources, a projector having a wide color reproduction range and low power consumption is obtainable.

Moreover, in such a projector, to uniformize a light amount (intensity) of illumination light emitted from an illumination device, the illumination device typically includes a predetermined uniformization optical system (a uniformization optical member). For example, in PTL 1 and PTL 2, a fly-eye lens is included as such a uniformization optical member.

CITATION LIST

Patent Literature

[PTL 1] Japanese Unexamined Patent Application Publication No. 2002-311382
[PTL 2] Japanese Unexamined Patent Application Publication No. 2012-8549

SUMMARY

Technical Problem

In such a projector, a reduction in luminance unevenness (illumination unevenness) in illumination light emitted from the illumination device and an improvement in display image quality are generally desired.

It is desirable to provide an illumination device and a display unit which are capable of reducing luminance unevenness in illumination light.

Solution to Problem

In an embodiment, an optical member is provided including a substrate, and a plurality of sub-regions two-dimensionally arranged on the substrate. Each of the sub-regions includes a plurality of unit lenses. The sub-regions and unit lenses are configured to spatially divide an incident light flux into a plurality of light fluxes according to the arrangement of the sub-regions while partially superimposing said divided light fluxes onto one another. Also, each of the sub-regions includes a plurality of the unit lenses arranged in a two-dimensional array, and each of the unit lenses has shape anisotropy.

In another embodiment, an illumination device includes a light source section, and an optical member configured to receive light from the light source section. The optical member includes a substrate, and a plurality of sub-regions two-dimensionally arranged on the substrate, each of the sub-regions including a plurality of unit lenses. The sub-regions and unit lenses are configured to spatially divide an incident light flux into a plurality of light fluxes according to the arrangement of the sub-regions while partially superimposing said divided light fluxes onto one another. Also, each of the sub-regions includes a plurality of the unit lenses arranged in a two-dimensional array, and each of the unit lenses has shape anisotropy.

In another embodiment, a display apparatus includes an illumination device including a light source and an optical member. The optical member includes a substrate, and a plurality of sub-regions two-dimensionally arranged on the substrate, each of the sub-regions including a plurality of unit lenses, and a display optical system for displaying an image with light emitted from the illumination device. The sub-regions and unit lenses are configured to spatially divide an incident light flux into a plurality of light fluxes according to the arrangement of the sub-regions while partially superimposing said divided light fluxes onto one another. Also, each of the sub-regions includes a plurality of the unit lenses arranged in a two-dimensional array, and each of the unit lenses has shape anisotropy.

Advantageous Effects of Invention

In the first illumination device and the first display unit according to the embodiments of the present disclosure, since the parameters in the sub-regions are set to allow crest portions and trough portions in the above-described light amount distributions obtained in the respective sub-regions to reduce one another by superimposition of the light amount distributions, luminance unevenness caused by the diffraction phenomenon is reduced. Therefore, luminance unevenness in illumination light is allowed to be reduced (display image quality is allowed to be improved).

In the second illumination device and the second display unit according to the embodiments of the present disclosure, since the position of the light-incident-side lens apex of the unit lens is different for each of the plurality of sub-regions, generation of luminance unevenness caused by machining marks on the unit lenses is suppressed. Therefore, luminance unevenness in illumination light is allowed to be reduced (display image quality is allowed to be improved). Moreover, in the sub-region in which the position of the light-incident-side lens apex is displaced from the position of the light-exit-side lens apex of the unit lens among the plurality of sub-regions, eccentric directions of the unit lenses adjacent to each other are opposite to each other; therefore, the unit lenses are easily formed. Accordingly, the first uniformization optical member is allowed to be manufactured easily.

Additional features and advantages are described herein, and will be apparent from the following Detailed Description and the figures.

BRIEF DESCRIPTION OF THE FIGURES

The accompanying drawings are included to provide a further understanding of the technology, and are incorporated in and constitute a part of this specification. The drawings illustrate embodiments and, together with the specification, serve to explain the principles of the technology.

FIG. 1 is a schematic view illustrating an entire configuration example of a display unit according to a first embodiment of the disclosure.

FIG. 2 is a schematic plan view illustrating a specific configuration example of a fly-eye lens illustrated in FIG. 1.

FIG. 3 is a schematic view illustrating a sectional configuration example of respective unit lenses illustrated in FIG. 2.

FIG. 4 is a diagram for describing a light amount distribution (diffraction unevenness) formed by one unit lens.

FIG. 5 is a photograph illustrating an example of luminance unevenness caused by diffraction unevenness described in FIG. 4.

FIG. 6 is a diagram for describing superimposition of light amount distributions formed by respective ones of unit lenses in respective sub-regions.

FIG. 7 is a diagram illustrating light amount distributions according to Example 1 and Comparative Example 1.

FIG. 8 is a schematic view illustrating an entire configuration example of a display unit according to Modification Example 1.

FIG. 9 is a schematic plan view illustrating a specific configuration example of a fly-eye lens illustrated in FIG. 8.

FIG. 10 is a schematic view illustrating a sectional configuration example of respective unit lenses illustrated in FIG. 9.

FIG. 11 is a schematic view illustrating an entire configuration example of a display unit according to a second embodiment.

FIG. 12 is a schematic plan view illustrating a specific configuration example of a fly-eye lens illustrated in FIG. 11.

FIG. 13 is a schematic view illustrating a sectional configuration example of respective unit lenses illustrated in FIG. 12.

FIG. 14 is a schematic sectional view for describing a difference in eccentric direction between unit lenses adjacent to each other in each sub-region illustrated in FIG. 12.

FIG. 15 is a schematic view for describing optical paths of outgoing light beams from a fly-eye lens according to Comparative Example 2.

FIG. 16 is a diagram for describing luminance unevenness caused by machining marks left on respective unit lenses in Comparative Example 2.

FIG. 17 is a schematic view illustrating an example of luminance unevenness caused by the machining marks described in FIG. 16.

FIG. 18 is a schematic view for describing an example of optical paths of outgoing light beams from the fly-eye lens illustrated in FIGS. 12 and 13.

FIG. 19 is a diagram illustrating an effect of reducing luminance unevenness caused by machining marks in Example 2.

FIG. 20 is a schematic view for describing another example of the optical paths of the outgoing light beams from the fly-eye lens illustrated in FIGS. 12 and 13.

FIG. 21 is a schematic view illustrating a sectional configuration example of respective unit lenses in a fly-eye lens according to Comparative Example 3.

FIG. 22 is a schematic view illustrating a sectional configuration example of respective unit lenses in a fly-eye lens according to Comparative Example 4.

FIG. 23 is a schematic view illustrating an entire configuration example of a display unit according to a third embodiment.

FIG. 24 is a schematic plan view illustrating a specific configuration example of a fly-eye lens illustrated in FIG. 23.

FIG. 25 is a schematic view illustrating an entire configuration example of a display unit according to Modification Example 2.

DETAILED DESCRIPTION

Some embodiments of the present disclosure will be described in detail below referring to the accompanying drawings. It is to be noted that description will be given in the following order.

1. First Embodiment (An example of an FEL in which an arrangement pitch of a unit lens is different for each sub-region)
2. Modification Example of First Embodiment
Modification Example 1 (An example of an FEL in which a thickness in an optical-axis direction of a unit lens is different for each sub-region)
3. Second Embodiment (An example of an FEL in which a position of a light-incident-side lens apex of a unit lens is different for each sub-region)
4. Third Embodiment (An example of an FEL using a combination of configurations of the first and second embodiments, or the like)
5. Modification Examples common to respective embodiments and the like
Modification Example 2 (An example in which any of respective embodiments is applied to an FEL with a double-stage configuration)
6. Other Modification Examples First Embodiment (Entire Configuration of Display Unit 3)

FIG. 1 illustrates an entire configuration of a display unit (a display unit 3) according to a first embodiment of the present disclosure. The display unit 3 is a projection display unit that projects an image (image light) onto a screen 30 (a projection surface). The display unit 3 includes an illumination device 1 and an optical system (a display optical system) for displaying an image with use of illumination light emitted from the illumination device 1.

(Illumination Device 1)

The illumination device 1 includes a red laser 11R, a green laser 1/G, a blue laser 11B, coupling lenses 12R, 12G, and 12B, dichroic prisms 131 and 132, an optical device 14, a drive section 140, a fly-eye lens (FEL) 15, and a condenser lens 17. It is to be noted that Z0 illustrated in the drawing represents an optical axis.

The red laser 11R, the green laser 11G, and the blue laser 11B are three kinds of light sources emitting red laser light, green laser light, and blue laser light, respectively. A light source section is configured of these laser light sources, and each of these three kinds of light sources in this case is a laser light source. Each of the red laser 11R, the green laser 11G, and the blue laser 11B may perform, for example, pulse light emission. In other words, each of them may intermittently (discontinuously) emit laser light with use of, for example, a predetermined light emission frequency (light emission cycle). Each of the red laser 11R, the green laser 11G, and the blue laser 11B may be configured of, for example, a laser diode or a solid laser. It is to be noted that, in a case where each of these laser light sources is a laser diode, a wavelength Lambda.r of the red laser light is about 600 nm to about 700 nm, a wavelength Lambda.g of the green laser light is about 500 nm to about 600 nm, and a wavelength Lambda.b of the blue laser light is about 400 nm to about 500 nm.

Moreover, laser light emitted from these laser light sources is generated by entering exciting light into a laser medium made of a laser crystal. In this case, an intensity distribution (a light amount distribution, an FFP (Far Field Pattern)) of the laser light is determined by a distribution of atoms or molecules of the laser crystal as the laser medium and the size of the crystal. An ideal light amount distribution (profile) of laser light generated is nearly a Gaussian distribution.

The coupling lens 12G is a lens (a coupling lens) for collimating green laser light emitted from the green laser 11G (into parallel light) to couple the collimated green laser light to the dichroic prism 131. Likewise, the coupling lens 12B is a lens (a coupling lens) for collimating blue laser light emitted from the blue laser 11B to couple the collimated blue laser light to the dichroic prism 131. Moreover, the coupling lens 12R is a lens (a coupling lens) for collimating red laser light emitted from the red laser 11R to couple the collimated red laser light to the dichroic prism 132. It is to be noted that each of these coupling lenses 12R, 12G, and 12B in this case collimates laser light incident thereon (into parallel light), but this is not limitative, and the laser light may not be collimated (into parallel light) by the coupling lenses 12R, 12G, and 12B. However, it may be more preferable to collimate the laser light in the above-described manner, because downsizing of a unit configuration is achievable.

The dichroic prism 131 selectively allows the blue laser light incident thereon through the coupling lens 12B to pass therethrough and selectively reflects the green laser light incident thereon through the coupling lens 12G. The dichroic prism 132 selectively allows the blue laser light and the green laser light emitted from the dichroic prism 131 to pass therethrough and selectively reflects the red laser light incident thereon through the coupling lens 12R. Thus, color synthesis (optical path synthesis) of the red laser light, the green laser light, and the blue laser light is performed.

The optical device 14 is a device disposed on an optical path of outgoing light (laser light) from the above-described light source section. In this case, the optical device 14 is disposed on an optical path between the light source section and the fly-eye lens 15 (more specifically, between the dichroic prism 132 and the fly-eye lens 15). The optical device 14 is an optical device for reducing so-called speckle noise in illumination light, and allows laser light traveling along the above-described optical path to passes therethrough. It is to be noted that such an optical device 14 may be configured of, for example, a lens (such as a lenticular lens), a prism array, or a diffractive device.

The drive section 140 drives the optical device 14. More specifically, the drive section 140 has a function of vibrating (micro-vibrating) the optical device 14 (for example, vibrating the optical device 14 in a direction along the optical axis Z0 or a direction perpendicular to the optical axis Z0). This function is capable of changing the state of a light flux passing through the optical device 14 to reduce speckle noise and the like. It is to be noted that such a drive section 140 may include, for example, a coil and a permanent magnet (for example, a permanent magnet made of neodymium (Nd), iron (Fe), boron (B), or the like).

The fly-eye lens 15 is an optical member (an integrator) configured of a plurality of unit cells (unit lenses which will be described later) that are two-dimensionally arranged on a substrate. The fly-eye lens 15 spatially divides an incident light flux into a plurality of light fluxes according to the arrangement of the unit lenses to emit the light fluxes. The fly-eye lens 15 is disposed on an optical path following the above-described optical device 14 (herein, between the optical device 14 and the condenser lens 17), and allows light (an incident light flux) incident from the light source section to pass therethrough. Moreover, the fly-eye lens 15 emits the divided light fluxes while superimposing the divided light fluxes on one another. Thus, outgoing light Lout from the fly-eye lens 15 is uniformized (an in-plane light amount distribution is uniformized), and then is emitted as illumination light. The fly-eye lens 15 corresponds to a specific example of "first uniformization optical member" in an embodiment of the present disclosure. It is to be noted that, in the fly-eye lens 15, obliquely incident light is also efficiently used as illumination light; therefore, as will be described later, unit lenses are formed not only on a light-incident surface Sin but also on a light-exit surface Sout.

FIG. 2 illustrates a planar (X-Y plane) configuration example of the fly-eye lens 15, and corresponds to a planar configuration viewed from the light incident surface Sin. Moreover, FIG. 3 illustrates a sectional (Y-Z section) configuration example of the fly-eye lens 15.

As illustrated in FIG. 2, a plurality of unit lenses (unit lenses UL11, UL12, UL13, and UL14 which will be described later) are two-dimensionally arranged to configure the fly-eye lens 15. In other words, the plurality of unit lenses are arranged along both an X-axis direction (herein, a horizontal direction) and a Y-axis direction (herein, a vertical direction). Moreover, each of the unit lenses has a planar (X-Y plane) shape with an anisotropic shape (herein, a rectangular shape) having a major-axis direction along the X-axis direction and a minor-axis direction along the Y-axis direction. An aspect ratio (a ratio of a length in the major-axis direction to a length in the minor-axis direction) in the anisotropic shape (the rectangular shape) is adjusted to be substantially equal (preferably equal) to an aspect ratio in a reflective liquid crystal device 21 which will be described later.

In the fly-eye lens 15 in this embodiment, as illustrated in FIG. 2, a light passing surface (the light incident surface Sin and the light exit surface Sout) is divided into a plurality of sub-regions (herein, four sub-regions A11, A12, A13, and A14). More specifically, four sub-regions A11, A12, A13, and A14 are arranged point-symmetrically with respect to a central point Pc on the light passing surface. Also in each of the sub-regions A11, A12, A13, and A14, a plurality of unit lenses are two-dimensionally arranged. More specifically, a plurality of unit lenses UL11 are two-dimensionally arranged in the sub-region A11, a plurality of unit lenses UL12 are two-dimensionally arranged in the sub-region A12, a plurality of unit lenses UL13 are two-dimensionally arranged in the sub-region A13, and a plurality of unit lenses UL14 are two-dimensionally arranged in the sub-region A14.

It is to be noted that, as described above, the number of the plurality of sub-regions may be preferably an even number, or the plurality of sub-regions may be preferably arranged point-symmetrically (or line-symmetrically) on the light passing surface to secure isotropy at light-flux incidence, because a light flux incident on the fly-eye lens 15 is expected to have an axis-symmetric circular, rectangular, or hexagonal shape with respect to the central point Pc.

Moreover, in the fly-eye lens 15, a parameter of a shape of the above-described unit lens is different for each of the plurality of sub-regions A11, A12, A13, and A14. More specifically, in this embodiment, as illustrated in FIG. 2, as the above-described parameter, an arrangement pitch of the unit lens in the light passing surface is different for each of the plurality of sub-regions A11, A12, A13, and A14. In other words, planar shapes of the unit lenses in the sub-regions A11, A12, A13, and A14 are similar to one another. More specifically, arrangement pitches w1, w2, w3, and w4 are set as follows, where an arrangement pitch (a pitch in the major-axis direction) of the unit lens UL11 in the sub-region A11 is w1, an arrangement pitch of the unit lens UL12 in the sub-region A12 is w2, an arrangement pitch of the unit lens UL13 in the sub-region A13 is w3, and an arrangement pitch of the unit lens UL14 in the sub-region A14 is w4. Then, the parameters (herein, the arrangement pitches w1 to w4) in the sub-regions A11, A12, A13, and A14 satisfy a following predetermined relationship.

$$w1:w2:w3:w4=1.05:1.00:0.95:0.90$$

$$(w1>w2>w3>w4)$$

On the other hand, as illustrated in FIG. 3, thicknesses in an optical-axis direction (a Z-axis direction) of the unit lenses UL11 to UL14 in the fly-eye lens 15 have a value (thickness: d) common to the sub-regions A11, A12, A13, and A14. It is to be noted that a specific configuration of such a fly-eye lens 15 will be described later.

The condenser lens 17 is a lens for condensing outgoing light Lout from the fly-eye lens 15 to emit the condensed outgoing light Lout as illumination light.

(Display Optical System)

The above-described display optical system is configured of a polarization beam splitter (PBS) 23, a field lens 22, the reflective liquid crystal device 21, and a projection lens 24 (a projection optical system).

The polarization beam splitter 23 is an optical member selectively allowing specific polarized light (for example, p-polarized light) to pass therethrough and selectively reflecting the other polarized light (for example, s-polarized light). Thus, illumination light (for example, s-polarized light) emitted from the illumination device 1 is selectively reflected by the polarization beam splitter 23 to enter the reflective liquid crystal device 21, and image light (for example, p-polarized light) emitted from the reflective liquid crystal device 21 selectively passes through the polarization beam splitter 23 to enter the projection lens 24.

The field lens 22 is disposed on an optical path between the polarization beam splitter 23 and the reflective liquid crystal device 21. The field lens 22 is a lens for downsizing the optical system by allowing illumination light to telecentrically enter the reflective liquid crystal device 21.

The reflective liquid crystal device 21 is a light modulation device reflecting illumination light from the illumination device 1 while modulating the illumination light based on an image signal supplied from a display control section (not illustrated) to emit image light. At this time, the reflective liquid crystal device 21 reflects light to allow light incident thereon and light exiting therefrom to have different polarization states (for example, s-polarization and p-polarization). The reflective liquid crystal device 21 may be configured of, for example, a liquid crystal device such as an LCOS (Liquid Crystal On Silicon).

The projection lens 24 is a lens for projecting (projecting in a magnified form), onto the screen 30, the illumination light (the image light) modulated by the reflective liquid crystal device 21.

(Specific Configuration of Fly-Eye Lens 15)

In the illumination device 1 according to this embodiment, in the fly-eye lens 15, the parameters (the arrangement pitches w1 to w4) in the sub-regions A11, A12, A13, and A14 are set to satisfy a following relationship. In other words, first, as will be described below, a light amount distribution formed on an irradiated surface (the reflective liquid crystal device 21) by outgoing light from each (one unit lens) of the unit lenses UL11 to UL14 has crest portions (bright portions or peak portions) and trough portions (dark portions or bottom portions). The arrangement pitches w1 to w4 in the sub-regions A11 to A14 are set to allow the crest portions and the trough portions in the above-described light amount distributions obtained in the respective sub-regions A11 to A14 to reduce one another by superimposition of the light amount distributions. In other words, the arrangement pitches w1 to w4 are so set as to arrange the crest portions and the trough portions in diffraction unevenness (luminance unevenness caused by a diffraction phenomenon) in illumination light which will be described later to reduce one another. As will be described in more detail later, such diffraction unevenness in illumination light is reduced.

The above-described light amount distribution (diffraction unevenness) formed on the reflective liquid crystal device 21 by outgoing light from one unit lens UL11 in the sub-region A11 is as illustrated in FIG. 4. In FIG. 4, optical magnification of an illumination system (determined by a relay system configured of the condenser lens 17 and the field lens 22) is Beta, an illumination region width by one unit lens UL11 is D1 (that is equal to Beta*w1), and an effective illumination region on the reflective liquid crystal device 21 is Deff. It is to be noted that the illumination region width D1 is set to be slightly larger than the effective illumination region Deff (D1 is larger than Deff) so as to enhance illumination efficiency and not to allow a non-illumination region to intrude into the effective illumination region Deff even if perturbation slightly occurs.

Then, as illustrated in FIG. 4, diffraction unevenness caused by the above-described crest portions and the above-described trough portions is generated on a light amount distribution in such an illumination region width D1. Herein, an interval between brightest portions (maximum peak portions) of the crest portions in the light amount distribution in the illumination region width D1 is h11, and an interval between second brightest portions (second peak portions) is h12. It is to be noted that these intervals h11 and h12 and the illumination region width D1 (that is equal to Beta*w1) are parameters dependent on design of the illumination optical system, and are allowed to be determined by calculation in principle.

In this case, the crest portions and the trough portions in the light amount distribution in the illumination region width D1 formed by the unit lens UL11 with the arrangement pitch w1 are reduced by crest portions and trough portions in a light amount distribution formed by the unit lens UL12 with the arrangement pitch w2 determined by a following expression (1). In other words, the crest portions and the trough portions in the light amount distributions formed by the unit lenses UL11 and UL12 with such two kinds of arrangement pitches w1 and w2 act to cancel each other out by superimposition of the crest portions and the trough portions in the light amount distributions.

[Math. 1]

$$w_2 = w_1 \times \frac{\left(\frac{h_{11} + h_{12}}{2}\right)}{h_{11}} \quad (1)$$

Moreover, an illumination region width in the light amount distribution formed by the unit lens UL12 with such an arrangement pitch w2 is D2 (that is equal to Beta*w2), an interval between brightest portions of crest portions in the light amount distribution in the illumination region width D2 is h21, and an interval between second brightest portions is h22. Then, the crest portions and the trough portions in the light amount distribution formed by the unit lens UL12 with the arrangement pitch w2 are reduced by crest portions and trough portions in a light amount distribution formed by the unit lens UL13 with the arrangement pitch w3 determined by a following expression (2).

[Math. 2]

$$w_3 = w_2 \times \frac{\left(\frac{h_{21} + h_{22}}{2}\right)}{h_{21}} \quad (2)$$

Therefore, a following generalized expression (3) is established, where the number of sub-regions is N (N is a natural number of 2 or larger), an arrangement pitch of a unit lens in an nth (n=1, 2, . . . , or N) sub-region is $w_n$, and an arrangement pitch of a unit lens in an (n−1)th sub-region is $w_{(n-1)}$.

[Math. 3]

$$w_n = w_{n-1} \times \frac{\left(\frac{h_{(n-1)1} + h_{(n-1)2}}{2}\right)}{h_{(n-1)1}} \quad (3)$$

Thus, since the arrangement pitches w1 to w4 of the unit lenses UL11 to UL14 in the sub-regions A11 to A14, respectively, are different from one another, sizes (illumination region widths) of light amount distributions formed by the unit lenses UL11 to UL14 are different from one another. Accordingly, as will be described later, positions of crest portions and trough portions in respective light amount distributions are displaced with respect to one another, thereby allowing the crest portions and trough portions to reduce one another.

(Functions and Effects of Display Unit 3)
(1. Display Operation)

In the display unit 3, as illustrated in FIG. 1, first, in the illumination device 1, light (laser light) emitted from the red laser 11R, the green laser 11G, and the blue laser 11B is collimated by the coupling lenses 12R, 12G, and 12B into parallel light, respectively. Next, the dichroic prisms 131 and 132 perform color synthesis (optical path synthesis) of the laser light (the red laser light, the green laser light, and the blue laser light) that is converted into the parallel light in the above-described manner. Each laser light subjected to the optical path synthesis passes through the optical device 14, the fly-eye lens 15, and the condenser lens 17 in this order to exit as illumination light. At this time, the outgoing light Lout from the fly-eye lens 15 is uniformized (the in-plane light amount distribution is uniformized) by the fly-eye lens 15. Thus, the illumination light is emitted from the illumination device 1.

Next, the illumination light is selectively reflected by the polarization beam splitter 23 to enter the reflective liquid crystal device 21 through the field lens 22. The reflective liquid crystal device 21 reflects the light incident thereon while modulating the light based on the image signal to emit the reflected and modulated light as image light. Since the reflective liquid crystal device 21 allows light incident thereon and light exiting therefrom to have different polarization states, the image light emitted from the reflective liquid crystal device 21 selectively passes through the polarization beam splitter 23 to enter the projection lens 24. Then, the incident light (the image light) is projected (projected in a magnified form) onto the screen 30 by the projection lens 24.

At this time, the red laser 11R, the green laser 11G, and the blue laser 11B intermittently perform light emission with use of, for example, a predetermined light emission frequency. Thus, each laser light (the red laser light, the green laser light, and the blue laser light) is sequentially emitted in a time-divisional manner. Then, based on image signals of respective color components (a red component, a green component, and a blue component), the reflective liquid crystal device 21 sequentially modulates laser light of corresponding colors in a time-divisional manner. Thus, a color image based on the image signals is displayed in the display unit 3.

(2. Action to Reduce Diffraction Unevenness)

Next, an action of the fly-eye lens 15 (an action to reduce diffraction unevenness in illumination light) will be described below.

First, since laser light has strong coherence, in a case where a fly-eye lens is disposed on an optical path, there is an issue that an interference component or a diffraction pattern is generated in an illumination image. More specifically, in a typical fly-eye lens, rectangular unit lenses are two-dimensionally arranged; therefore, a rectangular shape of the unit cell acts as an aperture for propagating light (laser light) to cause aperture diffraction (Fraunhofer diffraction). Then, an edge portion of illumination light is strongly affected by such diffraction to cause repetition of a high light-amount portion and a low light-amount portion in the illumination light, thereby generating luminance unevenness (diffraction unevenness) such as vibration amplitude. Thus, for example, as illustrated in FIG. 5, even in an image projected onto the screen 30, linear luminance unevenness (a diffraction light-dark pattern) may be generated in a peripheral portion of the projected image, thereby causing degradation in display image quality.

It is to be noted that there is considered, as measures against such diffraction unevenness, a technique in which diffraction unevenness is designed to extend to outside of the effective illumination region Deff on the above-described reflective liquid crystal device 21. However, in this case, although diffraction unevenness is reduced, light use efficiency is reduced.

Therefore, in this embodiment, the arrangement pitches w1 to w4 in the sub-regions A11 to A14 are set to satisfy a predetermined condition in light amount distributions formed on the irradiated surface (on the reflective liquid crystal device 21) by outgoing light from the unit lenses UL11 to UL14 in the fly-eye lens 15. More specifically, the arrangement pitches w1 to w4 are set to satisfy the above-described expression (3).

Thus, for example, as illustrated in FIG. 6, crest portions and trough portions in such light amount distributions obtained in the respective sub-regions A11 to A14 reduce one another by superimposition (weighted average) of the light amount distributions. More specifically, in this example, a light amount distribution formed by illumination light from the unit lens UL11 in the sub-region A11, a light amount distribution formed by illumination light from the unit lens UL12 in the sub-region A12, a light amount distribution formed by illumination light from the unit lens UL13 in the sub-region A13, and a light amount distribution formed by illumination light from the unit lens UL14 in the sub-region A14 are superimposed on one another.

Then, positions of the crest portions and trough portions in the respective light amount distributions are slightly displaced with respect to one another; therefore, a light amount distribution as a whole is planarized by superimposition of the light amount distributions. As a result, for example, as illustrated in FIG. 7, diffraction unevenness (luminance unevenness caused by a diffraction phenomenon) caused in the light amount distribution on the irradiated surface (on the reflective liquid crystal device 21) by coherence in laser light and two-dimensional arrangement of a plurality of unit lenses in the fly-eye lens 15 is reduced. More specifically, in an example (Example 1) of this embodiment, compared to Comparative Example 1 in which, unlike this embodiment, a fly-eye lens is not divided into sub-regions, generation of the crest portions and the trough portions in the light amount distribution is suppressed, and the above-described diffraction unevenness is reduced.

Thus, in this embodiment, the arrangement pitches w1 to w4 of the unit lenses UL11 to UL14 in the sub-regions A11 to A14 are set to allow the crest portions and the trough portions in the above-described light amount distributions obtained in the respective sub-regions A11 to A14 to reduce one another by superimposition of the light amount distributions; therefore, luminance unevenness caused by a diffraction phenomenon is reduced. Accordingly, luminance unevenness in illumination light is allowed to be reduced (display image quality is allowed to be improved).

Moreover, generation of such diffraction unevenness is reduced while keeping a position where diffraction unevenness is generated in the effective illumination region Deff on the reflective liquid crystal device 21; therefore, display image quality is allowed to be improved without reducing light use efficiency.

It is to be noted that, in a technique described in this embodiment (and the following modification examples relating to this embodiment), the crest portions and the trough portions in the light amount distributions does not necessarily cancel one another out completely, and it is only necessary to set respective parameters to allow the crest portions and the trough portions to reduce one another. In other words, even though respective parameters are slightly deviated from a condition in which the parameters completely cancel one another out, as long as the positions of the crest portions and the trough portions in the light amount distribution are slightly different for each of the sub-regions, diffraction unevenness is reduced to some extent, compared to a case where these positions in the sub-regions coincide with one another.

More specifically, as illustrated in the above-described expressions (1) and (2) (the expression (3) as a general expression) and FIG. 4, a case where a crest portion in a light amount distribution in a first sub-region is located at a position of a trough portion in a light amount distribution in a second sub-region is an optimum condition, and an effect of reducing diffraction unevenness is maximized. However, as illustrated in a following expression (4) or the like (an expression (5) as a general expression), and a range Delta.h in FIG. 4, the crest portion in the light amount distribution in the first sub-region may be located at a position closer to the trough portion than an intermediate point between the trough portion and a crest portion in the light amount distribution in the second sub-region. As long as the crest portion is located at such a position in the range Delta.h (as long as the expression (4) or the like, or the expression (5) is satisfied), the crest portions and the trough portions in the light amount distributions have a relationship in which they cancel one another out (reduce one another), thereby reducing diffraction unevenness. When a sample having an upper limit value and a lower limit value in the expression (5) (corresponding to, for example, a right-end position and a left-end position of the range Delta.h in FIG. 4) was actually fabricated, and an experiment was performed on the sample, a large effect of reducing diffraction unevenness close to the above-described optimum condition was obtained. Thus, in actual design, values of respective parameters may be adjusted in a range specified by the above-described expression (5) in addition to, for example, convenience in device fabrication. Moreover, a certain amount of manufacturing error is allowable.

[Math. 4]

$$W_1 \times \frac{\left(\frac{h_{11} + 3h_{12}}{4}\right)}{h_{(n-1)1}} < W_2 < W_1 \times \frac{\left(\frac{3h_{11} + h_{12}}{4}\right)}{h_{(n-1)1}} \quad (4)$$

$$W_{n-1} \times \frac{\left(\frac{h_{(n-1)1} + 3h_{(n-1)2}}{4}\right)}{h_{(n-1)1}} < W_n < W_{n-1} \times \frac{\left(\frac{3h_{(n-1)1} + h_{(n-1)2}}{4}\right)}{h_{(n-1)1}} \quad (5)$$

Modification Example 1

Next, a modification example (Modification Example 1) of the above-described first embodiment will be described below. It is to be noted that like components are denoted by like numerals as of the first embodiment, and will not be further described.

(Configuration of Display Unit 3A)

FIG. 8 illustrates an entire configuration of a display unit (a display unit 3A) according to Modification Example 1. The display unit 3A includes an illumination device (an illumination device 1A) according to Modification Example 1 and a display optical system for displaying an image with use of illumination light emitted from the illumination device 1A. In other words, the display unit 3A is different from the display unit 3 in that the illumination device 1A is included instead of the illumination device 1.

The illumination device 1A includes the red laser 11R, the green laser 11G, the blue laser 11B, the coupling lenses 12R, 12G, and 12B, the dichroic prisms 131 and 132, the optical device 14, the drive section 140, a fly-eye lens 15A, and the condenser lens 17. In other words, the illumination device 1A is different from the illumination device 1 in that the fly-eye lens 15A which will be described below is included instead of the fly-eye lens 15, and other configurations of the illumination device 1A are similar to those of the illumination device 1.

(Fly-Eye Lens 15A)

In the fly-eye lens 15 described in the first embodiment, the arrangement pitch of the unit lens is different for each of the plurality of sub-regions. On the other hand, in the fly-eye lens 15A, a thickness in an optical-axis direction of the unit lens is different for each of the plurality of sub-regions, and other configurations of the fly-eye lens 15A are similar to those of the fly-eye lens 15. In other words, in the fly-eye lens 15, the arrangement pitch of the unit lens corresponds to a specific example of "parameter" in an embodiment of the present disclosure, and in the fly-eye lens 15A, the thickness in the optical-axis direction of the unit lens corresponds to a specific example of "parameter" in an embodiment of the present disclosure.

FIG. 9 illustrates a planar (X-Y plane) configuration example of the fly-eye lens 15A, and corresponds to a planar configuration viewed from the light incident surface Sin. Moreover, FIG. 10 illustrates a sectional (Y-Z section) configuration example (a sectional configuration example taken along a line II-II illustrated in FIG. 9) of the fly-eye lens 15A.

As illustrated in FIG. 9, a plurality of unit lenses (unit lenses UL21, UL22, UL23, and UL24 which will be described later) are two-dimensionally arranged to configure the fly-eye lens 15A according to Modification Example 1. In other words, the plurality of unit lenses are arranged along both the X-axis direction and the Y-axis direction. Moreover, as with the first embodiment, each of the unit lenses has a planar (X-Y plane) shape with an anisotropic shape (herein, a rectangular shape) having a major-axis direction along the X-axis direction and a minor-axis direction along the Y-axis direction.

Also in the fly-eye lens 15A, as with the fly-eye lens 15, as illustrated in FIG. 9, a light passing surface (the light incident surface Sin and the light exit surface Sout) is divided into a plurality of sub-regions (herein, four sub-regions A21, A22, A23, and A24). More specifically, four sub-regions A21, A22, A23, and A24 are arranged point-symmetrically with respect to the central point Pc on the light passing surface. Also in each of the sub-regions A21, A22, A23, and A24, a plurality of unit lenses are two-dimensionally arranged. More specifically, a plurality of unit lenses UL21 are two-dimensionally arranged in the sub-region A21, a plurality of unit lenses UL22 are two-dimensionally arranged in the sub-region A22, a plurality of unit lenses UL23 are two-dimensionally arranged in the sub-region A23, and a plurality of unit lenses UL24 are two-dimensionally arranged in the sub-region A24.

Moreover, also in the fly-eye lens 15A, a parameter of a shape of each unit lens is different for each of the plurality of sub-regions A21, A22, A23, and A24. More specifically, in this modification example, as illustrated in FIG. 10, as the above-described parameter, the thickness in the optical-axis direction (the Z-axis direction) of the unit lens is different for each of the plurality of sub-regions A21, A22, A23, and A24. More specifically, for example, respective thicknesses d1 to d4 are set as follows, where a thickness in the optical-axis direction of the unit lens UL21 in the sub-region A21 is d1, a thickness in the optical-axis direction of the unit lens UL22 in the sub-region A22 is d2, a thickness in the optical-axis direction of the unit lens UL23 in the sub-region A23 is d3, and a thickness in the optical-axis direction of the unit lens UL24 in the sub-region A24 is d4. Then, the parameters (herein, the thicknesses d1 to d4 in the optical-axis direction) in the sub-regions A21, A22, A23, and A24 satisfy a following predetermined relationship.

$$d1:d2:d3:d4=1.03:1.00:0.97:0.94$$

$$(d1>d2>d3>d4)$$

On the other hand, as illustrated in FIG. 9, arrangement pitches of the unit lenses UL21 to UL24 in the fly-eye lens 15A have a value (arrangement pitch: w) common to the sub-regions A21, A22, A23, and A24. In other words, in this modification example, unlike the first embodiment, planar shapes (X-Y planes) of the unit lenses UL21 to UL24 are same as one another.

Moreover, also in this modification example, a light amount distribution formed on the irradiated surface (the reflective liquid crystal device 21) by outgoing light from each (one unit lens) of the unit lenses UL21 to UL24 has crest portions and trough portions. The thicknesses d1 to d4 in the optical-axis direction of the unit lenses UL21 to UL24 in the sub-regions A21 to A24 are set to allow such crest portions and such trough portions in the above-described light amount distributions obtained in the respective sub-regions A21 to A24 to reduce one another by superimposition of the light amount distributions.

In this case, as with the first embodiment, the above-described light amount distribution (diffraction unevenness) formed on the reflective liquid crystal device 21 by outgoing light from one unit lens UL21 in the sub-region A21 is as illustrated in FIG. 4. Therefore, also in this modification example, basically as with the first embodiment, crest portions and trough portions in a light amount distribution formed by the unit lens UL21 with the thickness d1 in the optical-axis direction are reduced by crest portions and trough portions in a light amount distribution formed by the unit lens UL22 with the thickness d2 in the optical-axis direction determined by a following expression (6).

It is to be noted that a coefficient Alpha is a coefficient representing change in magnification in a predetermined case. More specifically, for example, as with the first embodiment, in a case where the arrangement pitch of the unit lens is the above-described "parameter", the coefficient Alpha is equal to 1. It is because, in the case where the arrangement pitch of the unit lens is the above-described "parameter", only the arrangement pitch is a factor determining a diffraction pitch. On the other hand, for example, as with this modification example, in a case where the thickness in the optical-axis direction of the unit lens is the above-described "parameter", the coefficient Alpha is not equal to 1. It is because, in the case where the thickness in the optical-axis direction of the unit lens is the above-described "parameter", power of the unit lens is changed with the parameter (a magnification ratio between the unit lens and the reflective liquid crystal device 21 is changed, and positions where the above-described crest portions and the above-described trough portions reduce one another are also changed). In other words, it may be considered that the coefficient Alpha is a coefficient representing magnification change in a case where the thickness in the optical-axis direction (thickness on an axis) of the unit lens is changed. It is to be noted that a value of the coefficient Alpha is a variable value having an arbitrary value by design of the unit lens (for example, design of curvature, a thickness in the optical-axis direction, a refractive index, an aspherical surface coefficient, and the like). Incidentally, in the above-described specific example of d1:d2:d3:d4 (equal to 1.03: 1.00:0.97:0.94), the coefficient Alpha is equal to 1.02 (an example of an optimum value).

[Math. 5]

$$d_2 = d_1 \times \frac{\left(\frac{h_{11} + h_{12}}{2}\right)}{h_{11}} \times \alpha \qquad (6)$$

Moreover, the crest portions and the trough portions in the light amount distribution formed by the unit lens UL22 with the thickness d2 in the optical-axis direction are also reduced by crest portions and trough portions in the light amount distribution formed by the unit lens UL23 with the thickness d3 in the optical-axis direction determined by a following expression (7).

[Math. 6]

$$d_3 = d_2 \times \frac{\left(\frac{h_{21} + h_{22}}{2}\right)}{h_{21}} \times \alpha \qquad (7)$$

Therefore, a following generalized expression (8) is established, where the number of sub-regions is N (N is a natural number of 2 or larger), a thickness in the optical-axis direction of a unit lens in an nth (n=1, 2, . . . , or N) sub-region is $d_n$, and a thickness in the optical-axis direction of a unit lens in an (n−1)th sub-region is $d_{(n-1)}$.

[Math. 7]

$$d_n = d_{n-1} \times \frac{\left(\frac{h_{(n-1)1} + h_{(n-1)2}}{2}\right)}{h_{(n-1)1}} \times \alpha \qquad (8)$$

Thus, since the thicknesses d1 to d4 in the optical-axis direction of the unit lenses UL21 to UL24 in the sub-regions A21 to A24, respectively, are different from one another, sizes (illumination region widths) of light amount distributions formed by the unit lenses UL21 to UL24 are different from one another. Accordingly, also in this modification example, as with the first embodiment, positions of crest portions and trough portions in respective light amount distributions are displaced with respect to one another, thereby allowing the crest portions and trough portions to reduce one another.

(Functions and Effects of Display Unit 3A)

Thus, in the display unit 3A according to this modification example, the thicknesses d1 to d4 in the optical-axis direction in the sub-regions A21 to A24 are set to satisfy a predetermined condition in light amount distributions formed on the irradiated surface (on the reflective liquid crystal device 21) by outgoing light from the unit lenses UL21 to UL24 in the fly-eye lens 15A. More specifically, the thicknesses d1 to d4 in the optical-axis direction are set to satisfy the above-described expression (8).

Thus, as with the first embodiment, crest portions and trough portions in such light amount distributions obtained in the respective sub-regions A21 to A24 reduce one another by superimposition (weighted average) of the light amount distributions. As a result, also in this modification example, effects similar to those of the first embodiment are obtainable by functions similar to those of the first embodiment. In other words, luminance unevenness caused by a diffraction phenomenon is allowed to be reduced, and luminance unevenness in illumination light is allowed to be reduced (display image quality is allowed to be improved) accordingly.

It is to be noted that, also in this modification example, as with the first embodiment, the following is established. As illustrated in the above-described expressions (6) and (7) (the expression (8) as a general expression) and FIG. 4, a case where a crest portion in a light amount distribution in a first sub-region is located at a position of a trough portion in a light amount distribution in a second sub-region is an optimum condition, and an effect of reducing diffraction unevenness is maximized. However, as illustrated in a following expression (9) or the like (an expression (10) as a general expression), and the range Delta.h in FIG. 4, the crest portion in the light amount distribution in the first sub-region may be located at a position closer to the trough portion than an intermediate point between the trough portion and a crest portion in the light amount distribution in the second sub-region. As long as the crest portion is located at such a position in the range Delta.h (as long as the expression (9) or the like, or the expression (10) is satisfied), the crest portions and the trough portions in the light amount distributions have a relationship in which they cancel one another out (reduce one another), thereby reducing diffraction unevenness.

[Math. 8]

$$d_1 \times \frac{\left(\frac{h_{11} + 3h_{12}}{4}\right)}{h_{(n-1)1}} \times \alpha < d_2 < d_1 \times \frac{\left(\frac{3h_{11} + h_{12}}{4}\right)}{h_{(n-1)1}} \times \alpha \qquad (9)$$

$$d_{n-1} \times \frac{\left(\frac{h_{(n-1)1} + 3h_{(n-1)2}}{4}\right)}{h_{(n-1)1}} \times \alpha < d_n < d_{n-1} \times \frac{\left(\frac{3h_{(n-1)1} + h_{(n-1)2}}{4}\right)}{h_{(n-1)1}} \times \alpha \qquad (10)$$

Second Embodiment

Next, a second embodiment of the present disclosure will be described below. It is to be noted that like components are denoted by like numerals as of the first embodiment and the like, and will not be further described.

(Configuration of Display Unit 3B)

FIG. 11 illustrates an entire configuration of a display unit (a display unit 3B) according to the second embodiment. The display unit 3B includes an illumination device (an illumination device 1B) according to the second embodiment and a display optical system for displaying an image with use of illumination light emitted from the illumination device 1B. In other words, the display unit 3B is different from the display unit 3 in that the illumination device 1B is included instead of the illumination device 1.

The illumination device 1B includes the red laser 11R, the green laser 11G, the blue laser 11B, the coupling lenses 12R, 12G, and 12B, the dichroic prisms 131 and 132, the optical device 14, the drive section 140, a fly-eye lens 15B, and the condenser lens 17. In other words, the illumination device 1B is different from the illumination device 1 in that the fly-eye lens 15B which will be described below is included instead of the fly-eye lens 15, and other configurations of the illumination device 1B are similar to those of the illumination device 1.

(Fly-Eye Lens 15B)

In the fly-eye lens 15 described in the first embodiment, the arrangement pitch of the unit lens is different for each of the plurality of sub-regions. Moreover, in the fly-eye lens 15A in Modification Example 1, the thickness in the optical-axis direction of the unit lens is different for each of the plurality of sub-regions. On the other hand, in the fly-eye lens 15B in this embodiment, a position of a light-incident-side lens apex of the unit lens is different for each of the sub-regions.

FIG. 12 illustrates a planar (X-Y plane) configuration example of the fly-eye lens 15B, and corresponds to a planar configuration viewed from the light incident surface Sin. Moreover, FIG. 13 illustrates a sectional (Y-Z section) configuration example of the fly-eye lens 15B.

As illustrated in FIG. 12, a plurality of unit lenses (unit lenses UL31, UL32, UL33, UL34, and UL35 which will be described later) are two-dimensionally arranged to configure the fly-eye lens 15B according to this embodiment. In other words, the plurality of unit lenses are arranged along both the X-axis direction and the Y-axis direction. Moreover, as with the first embodiment and Modification Example 1, each of the unit lenses has a planar (X-Y plane) shape with an anisotropic shape (herein, a rectangular shape) having a major-axis direction along the X-axis direction and a minor-axis direction along the Y-axis direction.

Also in the fly-eye lens 15B, as with the fly-eye lenses 15 and 15A, as illustrated in FIG. 12, a light passing surface (the light incident surface Sin and the light exit surface Sout) is divided into a plurality of sub-regions (herein, five sub-regions A31, A32, A33, A34, and A35). More specifically, five sub-regions A31, A32, A33, A34, and A35 are arranged in this order on the light passing surface along a negative direction of the X axis when viewed from the light incident surface Sin. Also in each of the sub-regions A31, A32, A33, A34, and A35, a plurality of unit lenses are two-dimensionally arranged. More specifically, a plurality of unit lenses UL31 are two-dimensionally arranged in the sub-region A31, a plurality of unit lenses UL32 are two-dimensionally arranged in the sub-region A32, a plurality of unit lenses UL33 are two-dimensionally arranged in the sub-region A33, a plurality of unit lenses UL34 are two-dimensionally arranged in the sub-region A34, and a plurality of unit lenses UL35 are two-dimensionally arranged in the sub-region A35. It is to be noted that, also in this embodiment, as with Modification Example 1, planar shapes (X-Y planes) of the unit lenses UL31 to UL35 are the same as one another.

Moreover, in the fly-eye lens 15B, as illustrated in FIG. 13, a position of a light-incident-side lens apex Pin of each unit lens is different for each of the plurality of sub-regions A31, A32, A33, A34, and A35. On the other hand, a position of a light-exit-side lens apex Pout of each unit lens is the same in the plurality of sub-regions A31, A32, A33, A34, and A35. In other words, while the position of the light-incident-side lens apex Pin may be eccentric (may be displaced from a center of the X-Y plane shape), depending on the sub-regions, the position of the light-exit-side lens apex Pout is not eccentric (is located at the center of the X-Y plane shape) in any of the sub-regions. It is to be noted that, in this embodiment, as with the first embodiment, the thicknesses in the optical-axis direction (the Z-axis direction) of the unit lenses UL31 to UL35 have a common value (thickness; d).

Herein, a displacement amount (an eccentricity amount) of the light-incident-side lens apex Pin with respect to the position of the light-exit-side lens apex Pout in the unit lens is Delta, and an arrangement pitch in the vertical direction (the Y-axis direction) of the unit lens is p. As illustrated in FIG. 13, for example, a ratio (Delta/p) of the eccentricity amount Delta to the arrangement pitch p is set as follows in the unit lenses UL31 to UL35 in the sub-regions A31 to A35. It is to be noted that, for example, as illustrated in FIG. 13, an eccentric direction of the light-incident-side lens apex Pin (a displacement direction of the light-incident-side lens apex Pin with respect to the position of the light-exit-side lens apex Pout; a displacement direction of the eccentricity amount Delta) is indicated by an arrow located on a side of the eccentricity amount Delta.

Unit lens $UL31$: (Delta/$p$)=−0.10(−10%)

Unit lens $UL32$: (Delta/$p$)=−0.05(−5%)

Unit lens $UL33$: (Delta/$p$)=0.00(0%)

Unit lens $UL34$: (Delta/$p$)=+0.05(+5%)

Unit lens $UL35$: (Delta/$p$)=+0.10(+10%)

Moreover, in the fly-eye lens 15B, for example, as illustrated in FIG. 14, among the plurality of sub-regions A31 to A35, in a sub-region in which the position of the light-incident-side lens apex Pin is displaced (eccentric) from the position of the light-exit-side lens apex Pout in each of the unit lenses, the position of the light-incident-side lens apex Pin is displaced in the following manner. For example, as indicated by arrows in FIG. 14, in the sub-region (in this example, the sub-regions A31, A32, A34, and A35) in which the position of the light-incident-side lens apex Pin is eccentric in such a manner, the above-described eccentric directions (the displacement directions of the eccentricity amount Delta) of unit lenses adjacent to each other are opposite to each other (are alternately oriented). More specifically, for example, in the sub-region A31, the eccentric directions of the unit lenses UL31 adjacent to each other are opposite to each other. Likewise, the eccentric directions of the unit lenses UL32 adjacent to each other are opposite to each other in the sub-region A32, the eccentric directions of the unit lenses UL34 adjacent to each other are opposite to each other in the sub-region A34, and the eccentric directions of the unit lenses UL35 adjacent to each other are opposite to each other in the sub-region A35.

(Functions and Effects of Display Unit 3B)

In the display unit 3B according to this embodiment, the fly-eye lens 15B has the above-described configuration; therefore, generation of luminance unevenness caused by machining marks which will be described below on respective unit lenses is suppressed. An action to reduce luminance unevenness caused by such machining marks will be described in detail below in comparison with a comparative example (Comparative Example 2).

Comparative Example 2

First, in Comparative Example 2 in which a typical fly-eye lens 205 (using unit lenses in which the positions of the light-incident-side lens apex Pin and the light-exit-side lens apex Pout are not eccentric, unlike this embodiment) is included instead of the fly-eye lens 15B, luminance unevenness caused by machining marks on respective unit lenses in the fly-eye lens 205 is generated by a principle which will be described below.

More specifically, for example, as illustrated in FIG. 15, respective light beams having passed through a central point (the light-incident-side lens apex Pin and the light-exit-side lens apex Pout) in respective unit lenses UL (the eccentricity amount Delta=0) of the fly-eye lens 205 reach a same position P202 (a central position) on an irradiated surface (on the reflective liquid crystal device 21). Likewise, respective light beams having passed through a rearmost point in the X-axis direction in the respective unit lenses UL of the fly-eye lens 205 reach at a same position P203 (a forefront point in the X-axis direction) on the reflective liquid crystal device 21. Moreover, for example, respective light beams having passed through a forefront point in the X-axis direction in the respective unit lenses UL of the fly-eye lens 205 reach a same position P201 (a rearmost point in the X-axis direction) on the reflective liquid crystal device 21. Thus, in Comparative Example 2, light beams having passed through a same position in the respective unit lenses UL of the fly-eye lens 205 reach a same position on the reflective liquid crystal device 21.

Therefore, in a case where a similar (common) machining mark is left on each of the unit lenses UL of the fly-eye lens 205, luminance unevenness caused by such a machining mark is superimposed at a same position on the reflective liquid crystal device 21 (for example, refer to arrows in FIG. 16). As a result, for example, as schematically illustrated in FIG. 17, luminance unevenness caused by such a machining mark is generated also on the screen 30 on which a projected image is displayed, thereby degrading display image quality. It is to be noted that, since a concentric machining mark is typically left on each unit lens of the fly-eye lens, concentric luminance unevenness illustrated in FIGS. 16 and 17 is generated, and noticeable luminance unevenness is generated specifically in a central portion on the screen 30.

Such a machining mark is left on each unit lens because of a following reason. That is, in a case where a laser is used as a light source of an illumination device, while there is an advantage that downsizing of the light source is achievable, downsizing of each optical component is desired accordingly. Since the fly-eye lens herein is an assembly of a large number of unit lenses, each of the unit lenses is extremely small, i.e., as small as the order of hundreds of micrometers. Therefore, processing accuracy for an optical component is necessary in manufacturing, and in a processing level at present, a cutting mark (a machining mark) of a cutting tool is left during die machining for the unit lenses. Thus, a machining mark left on each unit lens of the fly-eye lens is caused by promotion of downsizing with use of a laser for the light source.

In this case, in principle, only a machining mark on a light incident surface of each of the unit lenses causes luminance unevenness caused by such a machining mark, and a machining mark on a light exit surface of each of the unit lenses does not cause luminance unevenness, because of a following reason. In a case where each of the unit lenses is a biconvex lens (a lens with convex surfaces on both the light incident surface and the light exit surface), for example, if the arrangement pitch, curvature, and the like are the same in the unit lenses, a same level of a machining mark is left on each of the unit lenses. In spite of this, only the machining mark on the light incident surface of each of the unit lenses causes luminance unevenness, because a conjugate relation in an illumination optical system is related. In other words, since an image on a light modulation device such as a reflective liquid crystal device is typically illuminated to be projected in a magnified form onto the screen, the screen and the light modulation device are so disposed as to have a conjugate relation. Next, description about which position in the illumination optical system the light modulation device has a conjugate relation with will be given referring to the above-described FIG. 15. When a light beam is retraced from the position P202 (a central point) on the reflective liquid crystal device 21 (a light modulation device) in FIG. 15 toward the illumination optical system, the light beam reach the position of the fly-eye lens 205 in a form of parallel light through the field lens 22 and the condenser lens 17. It is because the reflective liquid crystal device 21 is disposed at focal lengths of the field lens 22 and the condenser lens 17. At this time, if parallel light enters from the light exit surface of the fly-eye lens 205, a focal position thereof is located around the light incident surface (around the position of the light-incident-side lens apex Pin) of each unit lens UL in the fly-eye lens 205. Therefore, the position around the light incident surface in the fly-eye lens 205 and the position of the reflective liquid crystal device 21 have a conjugate relation. Thus, images having a conjugate relation form a conjugate image at a predetermined magnification; therefore, the machining mark on the light incident surface of each unit lens UL in the fly-eye lens 205 causes luminance unevenness. On the other hand, a conjugate relation position on the light exit surface of the fly-eye lens 205 is located in proximity to a pupil of the projection lens 24 for a light beam reflected by the reflective liquid crystal device 21 to travel toward the projection lens 24. Therefore, a position proximity to the light exit surface of the fly-eye lens 205 does not have a conjugate relation with the position of the reflective liquid crystal device 21, and the machining mark on the light exit surface of each unit lens UL in the fly-eye lens 205 does not cause luminance unevenness.

It is to be noted that a special processing method is considered to deal with luminance unevenness caused by the machining marks generated in such a principle. In other words, a technique in which the machining mark left on each unit lens is removed with use of the special processing method is considered. However, a special die processing tool is necessary; therefore, cost of the fly-eye lens may be increased, and processing time may be increased, thereby reducing manufacturing efficiency.

(Action to Reduce Luminance Unevenness Caused by Machining Marks)

Therefore, in this embodiment, generation of luminance unevenness caused by the machining marks is suppressed by contriving the shape of each of the unit lenses in the fly-eye lens 15B without using such a special processing method. In other words, as described above, the position of the light-incident-side lens apexes Pin of some of the unit lenses in the fly-eye lens 15B are eccentrically displaced to suppress generation of luminance unevenness caused by the machining marks.

More specifically, in the fly-eye lens 15B, for example, as illustrated in FIGS. 12 and 13, first, the light passing surface (the light incident surface Sin and the light exit surface Sout) is divided into a plurality of sub-regions A31 to A35. The positions of the light-incident-side lens apexes Pin of the unit lenses UL31 to UL35 in the plurality of sub-regions A31 to A35 are different from one another.

Therefore, as indicated by a reference numeral P1 in FIG. 18, light beams having passed through the light-incident-side lens apexes Pin of the unit lenses UL31 to UL35 in the plurality of sub-regions A31 to A35 reach different positions on the irradiated surface (on the reflective liquid crystal device 21). More specifically, in a representative example illustrated in FIG. 18, light beams having passed through the light-incident-side lens apex Pin of the unit lens UL31 in the sub-region A31, the light-incident-side lens apex Pin of the unit lens UL33 in the sub-region A33, and the light-incident-side lens apex Pin of the unit lens UL35 in the sub-region A35 reach different positions on the reflective liquid crystal device 21. In other words, by changing only optical paths (passing paths) of light beams passing through the fly-eye lens 15B without changing an illumination range on the reflective liquid crystal device 21 in the above-described Comparative Example 2 (refer to FIG. 15), an illumination relationship is changed so as not to allow the light beams to reach a same position on the reflective liquid crystal device 21.

It is to be noted that light beams having passed through the light-incident-side lens apexes Pin of the unit lenses UL31 to UL35 are illustrated as a representative, because light beams passing through the light-incident-side lens apexes Pin (where a noticeable machining mark is left) specifically causes luminance unevenness by the machining marks. In other words, as with the fly-eye lens 15B in this embodiment, even if the position of the light-incident-side lens apex Pin is eccentric, processing is concentrically performed during die processing on the unit lenses UL31 to UL35; therefore, a same machining mark is left about each light-incident-side lens apex Pin.

Thus, since light beams having passed through the light-incident-side lens apexes Pin of the unit lenses UL31 to UL35 in the plurality of sub-regions A31 to A35 reach different positions on the reflective liquid crystal device 21, influences of the machining marks on the unit lenses UL31 to UL35 are averaged. As a result, even though the machining marks are left on the unit lenses UL31 to UL35 by using an existing processing technique, the influences of such machining marks are apparently eliminated on the reflective liquid crystal device 21. Therefore, in this embodiment, for example, as with Example 2 illustrated in FIG. 19, compared to the above-described Comparative Example 2 illustrated in FIG. 16, generation of luminance unevenness caused by the machining marks on the unit lenses UL31 to UL35 is suppressed.

Moreover, for example, as indicated by reference numerals P21, P22, and P23 in FIG. 20, light beams having passed through the light-exit-side lens apexes Pout of the unit lenses UL31 to UL35 in the plurality of sub-regions A31 to A35 reach a same position on the reflective liquid crystal device 21. In other words, even though the light-incident-side lens apexes Pin of the unit lenses UL31, UL32, UL34, and UL35 are eccentric, as with Comparative Example 2 illustrated in FIG. 16, the light beams reach the same position on the reflective liquid crystal device 21. Therefore, since an illumination position on the reflective liquid crystal device 21 is not changed, light use efficiency is not reduced, compared to Comparative Example 2.

Further, in the fly-eye lens 15B in this embodiment, for example, as illustrated in FIG. 14, in sub-regions (the sub-regions A31, A32, A34, and A35) in which the position of the light-incident-side lens apex Pin is eccentric, the eccentric directions (displacement direction of the eccentricity amount Delta) of unit lenses adjacent to each other are opposite to each other. Therefore, since the shapes on the light incident surface Sin of the unit lenses are successive, compared to a case where, as with following Comparative Examples 3 and 4, eccentric directions of unit lenses adjacent to each other are the same as each other (are aligned in a same direction), following advantages are obtainable.

First, in a fly-eye lens 305 according to Comparative Example 3 illustrated in FIG. 21, eccentric directions (displacement directions of the eccentricity amount Delta indicated by arrows) of unit lenses UL301 adjacent to each other are the same as each other. Therefore, the shapes on the light incident surface Sin of the unit lenses UL301 are not successive, and it is difficult to form respective unit lenses UL301. On the contrary, in the fly-eye lens 15B in this embodiment, compared to such a fly-eye lens 305 in Comparative Example 3, respective unit lenses are easily formed.

Moreover, also in a fly-eye lens 405 according to Comparative Example 4 illustrated in FIG. 22, eccentric directions (displacement directions of the eccentricity amount Delta indicated by arrows) of unit lenses UL401 adjacent to each other are the same as each other. Moreover, an eccentric shape in the fly-eye lens 405 is provided to disperse, for example, a light source image, or has power to configure a composite device of a condenser lens and a fly-eye lens. In other words, the fly-eye lens 405 has a purpose of the eccentric shape and an eccentric shape different from those in the fly-eye lens 15B in this embodiment As described above, in this embodiment, the positions of the light-incident-side lens apexes Pin of the unit lenses UL31 to UL35 in the plurality of sub-regions A31 to A35 are different from one another; therefore, generation of luminance unevenness caused by the machining marks on the unit lenses UL31 to UL35 is suppressed. Thus, luminance unevenness in illumination light is allowed to be reduced (display image quality is allowed to be improved).

Moreover, in sub-regions (the sub-regions A31, A32, A34, and A35) in which the position of the light-incident-side lens apex Pin is eccentric among the plurality of sub-regions A31 to A35, the eccentric directions of unit lenses adjacent to each other are opposite to each other; therefore, the respective unit lenses are easily formed. Thus, the fly-eye lens 15B is allowed to be manufactured easily.

Third Embodiment

Next, a third embodiment of the present disclosure will be described below. It is to be noted that like components are denoted by like numerals as of the first and second embodiments and the like, and will not be further described.

(Configuration of Display Unit 3C)

FIG. 23 illustrates an entire configuration of a display unit (a display unit 3C) according to the third embodiment. The display unit 3C includes an illumination device (an illumination device 1C) according to the third embodiment and a display optical system for displaying an image with use of illumination light emitted from the illumination device 1C. In other words, the display unit 3C is different from the display unit 3 in that the illumination device 1C is included instead of the illumination device 1.

The illumination device 1C includes the red laser 11R, the green laser 11G, the blue laser 11B, the coupling lenses 12R, 12G, and 12B, the dichroic prisms 131 and 132, the optical device 14, the drive section 140, a fly-eye lens 15C, and the condenser lens 17. In other words, the illumination device 1C is different from the illumination device 1 in that the fly-eye lens 15C which will be described below is included instead of the fly-eye lens 15, and other configurations of the illumination device 1C are similar to those of the illumination device 1.

(Fly-Eye Lens 15C)

The fly-eye lens 15C in this embodiment is configured of a combination of the configuration of the fly-eye lens 15 described in the first embodiment and the fly-eye lens 15C described in the second embodiment.

In other words, for example, as can be seen from a planar (X-Y plane) configuration (a planar configuration example viewed from the light incident surface Sin) of the fly-eye lens 15C illustrated in FIG. 24, the fly-eye lens 15C has a following configuration.

First, predetermined parameters in the sub-regions A11 to A14 are set to satisfy a predetermined condition in light amount distributions formed on the irradiated surface (on the reflective liquid crystal device 21) by outgoing light from unit lenses in the fly-eye lens 15C. More specifically, the arrangement pitches w1 to w4 or the thicknesses d1 to d4 in the optical-axis direction of unit lenses in the sub-regions A11 to A14 are set to satisfy the above-described expression (5) or (10) (preferably, the above-described expression (3) or (8)).

Moreover, the positions of the light-incident-side lens apexes Pin of the unit lenses in the sub-regions A31 to A35 are different from one another. Then, in sub-regions (the sub-regions A31, A32, A34, and A35) in which the position of the light-incident-side lens apex Pin is eccentric, the eccentric directions (the displacement direction of the eccentricity amount Delta) of unit lenses adjacent to each other are opposite to each other.

Thus, since the above-described parameters (the arrangement pitches w1 to w4 or the thicknesses d1 to d4 in the optical-axis direction of the unit lenses) and eccentricity of the light-incident-side lens apex Pin are parameters independent of each other, even though the number of sub-regions is increased, such a fly-eye lens 15C is allowed to be formed. It is to be noted that, in an example of the fly-eye lens 15C, four sub-regions A11, A12, A13, and A14 are arranged point-symmetrically with respect to the central point Pc on the light passing surface. Moreover, at the same time, five sub-regions A31, A32, A33, A34, and A35 are arranged in this order on the light passing surface along the negative direction of the X axis when viewed from the light incident surface Sin.

(Functions and Effects of Display Unit 3C)

In the display unit 3C with such a configuration according to this embodiment, effects similar to those of the first and second embodiments are obtainable by functions similar to those of the first and second embodiments. In other words, both luminance unevenness caused by the diffraction phenomenon and luminance unevenness caused by machining marks on respective unit lenses are allowed to be reduced, and luminance unevenness in illumination light is allowed to be further reduced (display image quality is allowed to be further improved). Moreover, the fly-eye lens 15C is allowed to be manufactured easily.

It is to be noted that, in this embodiment, a case where the fly-eye lens 15C is configured of a combination of the configuration of the fly-eye lens 15 described in the first embodiment and the configuration of the fly-eye lens 15B described in the second embodiment is described; however, this embodiment is not limited thereto, and, for example, a fly-eye lens configured of a combination of the configuration of the fly-eye lens 15A described in Modification Example 1 and the configuration of the fly-eye lens 15B described in the second embodiment may be used. Also in this case, effects similar to those in Modification Example 1 and the second embodiment are obtainable by functions similar to those in Modification Example 1 and the second embodiment.

Modification Example 2

Next, a modification example (Modification Example 2) common to the above-described first to third embodiments and Modification Example 1 will be described below. This modification example is different from the first to third embodiments and Modification Example 1 in that, unlike the above-described fly-eye lenses, a fly-eye lens with a double-stage configuration is used instead of any of the fly-eye lenses according to the first to third embodiments and Modification Example 1. It is to be noted that like components are denoted by like numerals as of the first to third embodiments and the like, and will not be further described.

(Configuration of Display Unit 3D)

FIG. 25 illustrates an entire configuration of a display unit (a display unit 3D) according to Modification Example 2. The display unit 3D includes an illumination device (an illumination device 1D) according to Modification Example 2 and a display optical system for displaying an image with use of illumination light emitted from the illumination device 1D. In other words, the display unit 3D is different from the display unit 3 in that the illumination device 1D is included instead of the illumination device 1.

The illumination device 1D includes the red laser 11R, the green laser 11G, the blue laser 11B, the coupling lenses 12R, 12G, and 12B, the dichroic prisms 131 and 132, the optical device 14, the drive section 140, fly-eye lenses 151 and 152, sub-condenser lenses 161 and 162, and the condenser lens 17. Thus, the illumination device 1D corresponds to any of the illumination device 1 and the like that further includes the fly-eye lens 151 disposed in a preceding stage and the sub-condenser lenses 161 and 162, and other configurations of the illumination device 1D are similar to those of the illumination device 1 and the like.

(Fly-Eye Lenses 151 and 152)

The fly-eye lenses 151 and 152 are optical members (integrators) each configured of a plurality of lenses that are two-dimensionally arranged on a substrate. Each of the fly-eye lenses 151 and 152 spatially divides an incident light flux into a plurality of light fluxes according to the arrangement of the unit lenses to emit the light fluxes. The fly-eye lens 151 is a fly-eye lens disposed in a preceding stage when viewed from the light source section, and is disposed on an optical path between the light source section and the fly-eye lens 152 (more specifically, on an optical path between the dichroic prism 132 and the optical device 14). The fly-eye lens 152 is a fly-eye lens disposed in a following stage, and is disposed on an optical path between the optical device 14 and the condenser lens 17. These fly-eye lenses 151 and 152 emit the divided light fluxes while superimposing the divided light fluxes on one another. Thus, outgoing light L2out from the fly-eye lens 152 is uniformized (an in-plane light amount distribution is uniformized), and then is emitted as illumination light.

In this modification example, the fly-eye lens 152 disposed in the following stage of these two fly-eye lenses 151 and 152 (two stages) is configured of any of the fly-eye lenses 15 and 15A to 15C described above. In other words, the fly-eye lens 151 corresponds to a specific example of "second uniformization optical member" in an embodiment of the present disclosure, and the fly-eye lens 152 corresponds to a specific example of "first uniformization optical member" in an embodiment of the present disclosure.

(Sub-Condenser Lenses 161 and 162)

Each of the sub-condenser lenses 161 and 162 is disposed on an optical path between the two fly-eye lenses 151 and 152 (the sub-condenser lens 161 is disposed closer to the fly-eye lens 151 and the sub-condenser lens 162 is disposed closer to the fly-eye lens 152). Each of the sub-condenser lenses 161 and 162 is a lens having positive power, and configures a relay optical system. More specifically, the sub-condenser lens 161 is a lens for condensing outgoing light from the fly-eye lens 151 to allow the condensed outgoing light to enter the optical device 14. Likewise, the sub-condenser lens 162 is a lens for condensing outgoing light from the optical device 14 to allow the condensed outgoing light to enter the fly-eye lens 152.

(Functions and Effects of Display Unit 3D)

Also in the display unit 3D with such a configuration according to this modification example, effects similar to those of the first to third embodiments and Modification Example 1 are obtainable by functions similar to those of the first to third embodiments and Modification Example 1. In other words, one or both of luminance unevenness caused by the diffraction phenomenon and luminance unevenness caused by machining marks on unit lenses are allowed to be reduced, and luminance unevenness in illumination light is allowed to be reduced (display image quality is allowed to be reduced). Moreover, in a case where luminance unevenness caused by machining marks is reduced, the fly-eye lenses are allowed to be manufactured easily.

Further, in this modification example, the illumination device 1D includes the fly-eye lenses 151 and 152 configuring a double-stage configuration; therefore, a light amount distribution of the incident light onto the fly-eye lens 152 disposed in the following stage is uniformized by the fly-eye lens 151 disposed in the preceding stage. Since the light amount distribution of the incident light onto the fly-eye lens 152 disposed in the following stage is uniformized without depending on a divergent angle of a laser in such a manner, an f-number (a pseudo f-number F') is uniquely determined by optical design of an illumination optical system, and following variations in characteristics are suppressed. In other words, in a typical optical system using a laser as a light source, variations in divergent angle in the laser cause variations in the depth of focus or variations in degree of speckle noise, thereby greatly affecting projector characteristics; however, in this modification example, such variations are allowed to be suppressed.

Moreover, in a typical projector using laser light, a light amount distribution at a pupil conjugate position is absolutely a laser radiation distribution (a Gaussian distribution); therefore, intensity around a center is strong. Accordingly, also a light amount distribution at a pupil position has strong intensity around a center thereof, and it is necessary to limit intensity of laser light (a light amount of illumination light), because such a light amount distribution may cause dangers to human's (user's) eyes.

On the other hand, in this modification example, as described above, by the fly-eye lenses 151 and 152 configuring the double-stage configuration, the light amount distribution of the incident light onto the fly-eye lens 152 disposed in the following stage is uniformized. Therefore, the light amount distribution at the pupil position is also uniformized to cause less damage to human's eyes. As a result, a loose limit to the intensity of laser light (the light amount of illumination light) is only necessary, and a projector having a bright display image while complying with safety standards is allowed to be configured.

Other Modification Examples

Although the technology of the present disclosure is described referring to the embodiments and the modification examples, the technology is not limited thereto, and may be variously modified.

For example, in the above-described embodiments and the like, a case where the light passing surface of the fly-eye lens is divided into four or five sub-regions or in a pattern configured of a combination of four sub-regions and five sub-regions is described; however, the number of sub-regions (and arrangement of these sub-regions) is not limited thereto. More specifically, when the number of sub-regions is increased (the light passing surface is divided into smaller sub-regions) to an extent that manufacturing is possible, characteristics are allowed to be further improved (luminance unevenness is allowed to be further suppressed).

Moreover, in the above-described embodiments and the like, a case where each of the "first and second uniformization optical members" in any of the embodiments of the present disclosure is configured of the fly-eye lens is described as an example; however, each of the first and second uniformization optical members may be configured of any other optical member (for example, a rod integrator).

In the above-described embodiments and the like, a case where the optical device 14 and the drive section 140 are included in the illumination device is described; however, the technology is not limited thereto, and they may not be included in the illumination device.

In addition, in the above-described embodiments and the like, a case where a plurality of kinds (red, green, and blue) of light sources are all laser light sources is described; however, the technology is not limited thereto. More specifically, for example, in the first embodiment and Modification Example 1, modification examples thereof, and the like, one or more of the plurality of kinds of light sources may be laser light sources. In other words, a combination of a laser light source and any other light source (for example, an LED) may be included in the light source section. Moreover, in the second embodiment, modification examples thereof, and the like, any combination of light sources (for example, LEDs) other than the laser light source may be included instead of the plurality of light sources.

In the above-described embodiments and the like, a case where the light modulation device is the reflective liquid crystal device is described as an example; however, the technology is not limited thereto. Alternatively, the light modulation device may be, for example, a transmissive liquid crystal device, or a light modulation device (for example, a DMD (Digital Micromirror Device) other than the liquid crystal devices.

In the above-described embodiments and the like, a case where three kinds of light sources emitting light of different wavelengths are used is described; however, for example, one kind, two kinds, or four or more kinds of light sources may be used, instead of the three kinds of light sources.

In the above-described embodiments and the like, respective components (optical systems) of the illumination device and the display unit are specifically described; however, it is not necessary to include all of the components, or other components may be further included. More specifically, for example, dichroic mirrors may be included, instead of the dichroic prisms 131 and 132. Moreover, a prism may be included, instead of the polarizing beam splitter 23.

In the above-described embodiments and the like, the display unit is configured as a projection display unit including the projection optical system (the projection lens) that projects, onto the screen, light modulated by the light modulation device is described; however, the technology is also applicable to a direct-view display unit and the like.

It is to be noted that the technology is allowed to have following configurations.

(1) An optical member comprising:
a substrate; and
a plurality of sub-regions two-dimensionally arranged on the substrate, each of the sub-regions including a plurality of unit lenses,
wherein the sub-regions and unit lenses are configured to spatially divide an incident light flux into a plurality of light fluxes according to the arrangement of the sub-regions while partially superimposing said divided light fluxes onto one another, and
wherein each of the sub-regions includes a plurality of the unit lenses arranged in a two-dimensional array, and each of the unit lenses has shape anisotropy.

(2) The optical member according to (1), wherein the divided light fluxes of the respective sub-areas are superimposed by an amount sufficient to at least partially cancel a diffraction unevenness of the light fluxes of adjacent sub-regions.

(3) The optical member according to any one of (1) to (2), wherein the sub-regions are arranged point-symmetrically with respect to a central point of a light incident surface of the optical member.

(4) The optical member according to any one of (1) to (3), wherein arrangement pitches between the units lenses differ in each of the sub-regions.

(5) The optical member according to any one of (1) to (4), wherein when the number of sub-regions is N, an arrangement pitch of a unit lens in an nth (n=1, 2, . . . , or N) sub-region is $w_n$, and an arrangement pitch of a unit lens in an adjacent (n−1)th sub-region is $w_{(n-1)}$ satisfy the following relationship

[Math. 3]

$$w_n = w_{n-1} \times \frac{\left(\frac{h_{(n-1)1} + h_{(n-1)2}}{2}\right)}{h_{(n-1)1}} \quad (3)$$

wherein N is a natural number of 2 or larger, $h_1$ is an interval between brightest peak portions in a light amount distribution of an illumination region for the respective sub-region, and $h_2$ is an interval between second brightest peak portions in the light amount distribution for the respective sub-region.

(6) The optical member according to any one of (1) to (5), wherein thicknesses of the unit lenses in an optical-axis direction differ with respect to each of the sub-regions.

(7) The optical member according to any one of (1) to (6), wherein when the number of sub-regions is N, a thickness in the optical-axis direction of a unit lens in an nth (n=1, 2, . . . , or N) sub-region is $d_n$, and a thickness in the optical-axis direction of an unit lens in an adjacent (n−1)th sub-region is $d_{(n-1)}$ satisfy the following relationship

[Math. 7]

$$d_n = d_{n-1} \times \frac{\left(\frac{h_{(n-1)1} + h_{(n-1)2}}{2}\right)}{h_{(n-1)1}} \times \alpha \quad (8)$$

wherein N is a natural number of 2 or larger, wherein alpha is a suitable coefficient value representing a change in magnification, $h_1$ is an interval between brightest peak portions in a light amount distribution of an illumination region for the respective sub-region, and $h_2$ is an interval between second brightest peak portions in the light amount distribution for the respective sub-region.

(8) The optical member according to any one of (1) to (7), wherein for each of the unit lenses, positions of light-incident side unit lens apexes deviate from optical axes of the respective unit lenses, and a magnitude of the deviations of the light-incident side unit lens apexes differ with respect to each of the sub-regions.

(9) The optical member according to any one of (1) to (8), wherein positions of light-exiting side unit lens apexes of the unit lenses are the same for each of the sub-regions.

(10) The optical member according to any one of (1) to (9), wherein for each sub-region, the unit lenses are arranged in a two-dimensional array, and the directions of the deviations of adjacent unit lenses are opposite relative to the optical axis of the respective unit lenses.

(11) The optical member according to any one of (1) to (10), wherein arrangement pitches between the units lenses differ in each of the sub-regions,
wherein thicknesses of the unit lenses in an optical-axis direction differ with respect to each of the sub-regions, and
wherein for each of the unit lenses, positions of light-incident side unit lens apexes deviate from optical axes of the respective unit lenses, and a magnitude of the deviations of the light-incident side unit lens apexes differ with respect to each of the sub-regions.

(12) An illumination device comprising:
a light source section; and
an optical member configured to receive light from the light source section, the optical member including
a substrate, and
a plurality of sub-regions two-dimensionally arranged on the substrate,
each of the sub-regions including a plurality of unit lenses,
wherein the sub-regions and unit lenses are configured to spatially divide an incident light flux into a plurality of light fluxes according to the arrangement of the sub-regions while partially superimposing said divided light fluxes onto one another, and
wherein each of the sub-regions includes a plurality of the unit lenses arranged in a two-dimensional array, and each of the unit lenses has shape anisotropy.

(13) The illumination device according to (12), wherein the divided light fluxes of the respective sub-areas are superimposed by an amount sufficient to at least partially cancel a diffraction unevenness of the light fluxes of adjacent sub-regions.

(14) The illumination device according to any one of (12) to (13), wherein the sub-regions are arranged point-symmetrically with respect to a central point of a light incident surface of the optical member.

(15) The illumination device according to any one of (12) to (14), wherein arrangement pitches between the units lenses differ in each of the sub-regions.

(16) The illumination device according to any one of (12) to (15), wherein when the number of sub-regions is N, an arrangement pitch of a unit lens in an nth (n=1, 2, . . . , or N) sub-region is $w_n$, and an arrangement pitch of a unit lens in an adjacent (n−1)th sub-region is $w_{(n-1)}$ satisfy the following relationship

[Math. 3]

$$w_n = w_{n-1} \times \frac{\left(\frac{h_{(n-1)1} + h_{(n-1)2}}{2}\right)}{h_{(n-1)1}} \quad (3)$$

wherein N is a natural number of 2 or larger, $h_1$ is an interval between brightest peak portions in a light amount distribution of an illumination region for the respective sub-region, and $h_2$ is an interval between second brightest peak portions in the light amount distribution for the respective sub-region.

(17) The illumination device according to any one of (12) to (16), wherein thicknesses of the unit lenses in an optical-axis direction differ with respect to each of the sub-regions.

(18) The illumination device according to any one of (12) to (17), wherein when the number of sub-regions is N, a thickness in the optical-axis direction of a unit lens in an nth (n=1, 2, . . . , or N) sub-region is $d_n$, and a thickness in the optical-axis direction of an unit lens in an adjacent (n−1)th sub-region is $d_{(n-1)}$ satisfy the following relationship

[Math. 7]

$$d_n = d_{n-1} \times \frac{\left(\frac{h_{(n-1)1} + h_{(n-1)2}}{2}\right)}{h_{(n-1)1}} \times \alpha \quad (8)$$

wherein N is a natural number of 2 or larger, wherein alpha is a suitable coefficient value representing a change in magnification, $h_1$ is an interval between brightest peak portions in a light amount distribution of an illumination region for the respective sub-region, and $h_2$ is an interval between second brightest peak portions in the light amount distribution for the respective sub-region.

(19) The illumination device according to any one of (12) to (18), wherein for each of the unit lenses, positions of light-incident side unit lens apexes deviate from optical axes of the respective unit lenses, and a magnitude of the deviations of the light-incident side unit lens apexes differ with respect to each of the sub-regions.

(20) The illumination device according to any one of (12) to (19), wherein positions of light-exiting side unit lens apexes of the unit lenses are the same for each of the sub-regions.

(21) The illumination device according to any one of (12) to (20), wherein for each sub-region, the unit lenses are arranged in a two-dimensional array, and the directions of the deviations of adjacent unit lenses are opposite relative to the optical axis of the respective unit lenses.

(22) The illumination device according to any one of (12) to (21),
wherein arrangement pitches between the units lenses differ in each of the sub-regions,
wherein thicknesses of the unit lenses in an optical-axis direction differ with respect to each of the sub-regions, and
wherein for each of the unit lenses, positions of light-incident side unit lens apexes deviate from optical axes of the respective unit lenses, and a magnitude of the deviations of the light-incident side unit lens apexes differ with respect to each of the sub-regions.

(23) A display apparatus comprising:
an illumination device including a light source and an optical member, the optical member including
a substrate, and
a plurality of sub-regions two-dimensionally arranged on the substrate,
each of the sub-regions including a plurality of unit lenses; and
a display optical system for displaying an image with light emitted from the illumination device,
wherein the sub-regions and unit lenses are configured to spatially divide an incident light flux into a plurality of light fluxes according to the arrangement of the sub-regions while partially superimposing said divided light fluxes onto one another, and
wherein each of the sub-regions includes a plurality of the unit lenses arranged in a two-dimensional array, and each of the unit lenses has shape anisotropy.

(24) The display apparatus according to (23), wherein the divided light fluxes of the respective sub-areas are superimposed by an amount sufficient to at least partially cancel a diffraction unevenness of the light fluxes of adjacent sub-regions.

(25) The display apparatus according to any one of (23) to (24), wherein the sub-regions are arranged point-symmetrically with respect to a central point of a light incident surface of the optical member.

(26) The display apparatus according to any one of (23) to (25), wherein arrangement pitches between the units lenses differ in each of the sub-regions.

(27) The display apparatus according to any one of (23) to (26), wherein when the number of sub-regions is N, an arrangement pitch of a unit lens in an nth (n=1, 2, . . . , or N) sub-region is $w_n$, and an arrangement pitch of a unit lens in an adjacent (n−1)th sub-region is $w_{(n-1)}$ satisfy the following relationship

[Math. 3]

$$w_n = w_{n-1} \times \frac{\left(\frac{h_{(n-1)1} + h_{(n-1)2}}{2}\right)}{h_{(n-1)1}} \quad (3)$$

wherein N is a natural number of 2 or larger, $h_1$ is an interval between brightest peak portions in a light amount distribution of an illumination region for the respective sub-region, and $h_2$ is an interval between second brightest peak portions in the light amount distribution for the respective sub-region.

(28) The display apparatus according to any one of (23) to (27), wherein thicknesses of the unit lenses in an optical-axis direction differ with respect to each of the sub-regions.

(29) The display apparatus according to any one of (23) to (28), wherein when the number of sub-regions is N, a thickness in the optical-axis direction of a unit lens in an nth (n=1, 2, . . . , or N) sub-region is $d_n$, and a thickness in the optical-axis direction of an unit lens in an adjacent (n−1)th sub-region is $d_{(n-1)}$ satisfy the following relationship

[Math. 7]

$$d_n = d_{n-1} \times \frac{\left(\frac{h_{(n-1)1} + h_{(n-1)2}}{2}\right)}{h_{(n-1)1}} \times \alpha \quad (8)$$

wherein N is a natural number of 2 or larger, wherein alpha is a suitable coefficient value representing a change in magnification, $h_1$ is an interval between brightest peak portions in a light amount distribution of an illumination region for the respective sub-region, and $h_2$ is an interval between second brightest peak portions in the light amount distribution for the respective sub-region.

(30) The display apparatus according to any one of (23) to (29), wherein for each of the unit lenses, positions of light-incident side unit lens apexes deviate from optical axes of the respective unit lenses, and a magnitude of the deviations of the light-incident side unit lens apexes differ with respect to each of the sub-regions.

(31) The display apparatus according to any one of (23) to (30), wherein positions of light-exiting side unit lens apexes of the unit lenses are the same for each of the sub-regions.

(32) The display apparatus according to any one of (23) to (31), wherein for each sub-region, the unit lenses are arranged in a two-dimensional array, and the directions of the deviations of adjacent unit lenses are opposite relative to the optical axis of the respective unit lenses.

(33) The display apparatus according to any one of (23) to (32), wherein arrangement pitches between the units lenses differ in each of the sub-regions, wherein thicknesses of the unit lenses in an optical-axis direction differ with respect to each of the sub-regions, and wherein for each of the unit lenses, positions of light-incident side unit lens apexes deviate from optical axes of the respective unit lenses, and a magnitude of the deviations of the light-incident side unit lens apexes differ with respect to each of the sub-regions.

It is further to be noted that the technology is allowed to have following configurations.

[1] An illumination device including:
a light source section including a laser light source; and
a first uniformization optical member including a plurality of unit lenses that are two-dimensionally arranged, and allowing light from the light source section to pass therethrough,
in which a light passing surface of the first uniformization optical member is divided into a plurality of sub-regions, and a parameter of a shape of the unit lens is different for each of the plurality of sub-regions, and
the parameters in the sub-regions are set to allow crest portions and trough portions in light amount distributions formed on an irradiated surface by outgoing light from the unit lenses and obtained in the respective sub-regions to reduce one another by superimposition of the light amount distributions.

[2] The illumination device according to [1], in which a following expression (1) is satisfied:

[Math. 9]

$$P_{n-1} \times \frac{\left(\frac{h_{(n-1)1} + 3h_{(n-1)2}}{4}\right)}{h_{(n-1)1}} \times \alpha < P_n < P_{n-1} \times \frac{\left(\frac{3h_{(n-1)1} + h_{(n-1)2}}{4}\right)}{h_{(n-1)1}} \times \alpha \quad (11)$$

where N is the number of the plurality of sub-regions,
$P_n$ is the parameter of the unit lens in an nth sub-region, where n is 1, 2, . . . , N,
$p_{n-1}$ is the parameter of the unit lens in an (n−1)th sub-region, $h_{(n-1)1}$ is an interval between brightest portions of the crest portions in the light amount distribution formed by the unit lens in the (n−1)th sub-region, $h_{(n-1)2}$ is an interval between second brightest portions of the crest portions in the light amount distribution formed by the unit lens in the (n−1)th sub-region, and Alpha is a coefficient representing change in magnification in a predetermined case.

[3] The illumination device according to [2], in which
the parameter is an arrangement pitch of the unit lens in the light passing surface, and
the coefficient Alpha is equal to 1.

[4] The illumination device according to [2], in which
the parameter is a thickness in an optical-axis direction of the unit lens, and
the coefficient Alpha is not equal to 1.

[5] The illumination device according to [3] or [4], in which
a position of a light-incident-side lens apex of the unit lens is also different for each of the plurality of sub-regions, and
in a sub-region in which the position of the light-incident-side lens apex is displaced from a position of a light-exit-side lens apex of the unit lens among the plurality of sub-regions, eccentric directions of the unit lenses adjacent to each other are opposite to each other, the eccentric direction being a displacement direction of the light-incident side lens apex with respect to the position of the light-exit-side lens apex.

[6] The illumination device according to any one of [1] to [5], in which the number of the plurality of sub-regions is an even number.

[7] The illumination device according to any one of [1] to [6], in which the plurality of sub-regions are arranged point-symmetrically on the light passing surface.

[8] The illumination device according to any one of [1] to [7], in which the first uniformization optical member is configured of a fly-eye lens.

[9] The illumination device according to any one of [1] to [8], further including a second uniformization optical member on an optical path between the light source section and the first uniformization optical member.

[10] A display unit including:
an illumination device emitting illumination light; and
a light modulation device modulating the illumination light, based on an image signal,
in which the illumination device includes
a light source section including a laser light source, and
a first uniformization optical member including a plurality of unit lenses that are two-dimensionally arranged, and allowing light from the light source section to pass therethrough,
a light passing surface of the first uniformization optical member is divided into a plurality of sub-regions, and
a parameter of a shape of the unit lens is different for each of the plurality of sub-regions, and
the parameters in the sub-regions are set to allow crest portions and trough portions in light amount distributions formed on an irradiated surface by outgoing light from the unit lenses and obtained in the respective sub-regions to reduce one another by superimposition of the light amount distributions.

[11] The display unit according to [10], further including a projection optical system projecting the illumination light modulated by the light modulation device onto a projection surface.

[12] The display unit according to [10] or [11], in which the light modulation device is a liquid crystal device.

[13] An illumination device including:
a light source section; and
a first uniformization optical member including a plurality of unit lenses that are two-dimensionally arranged, and allowing light from the light source section to pass therethrough,
in which a light passing surface of the first uniformization optical member is divided into a plurality of sub-regions, and a position of a light-incident-side lens apex of the unit lens is different for each of the plurality of sub-regions, and
in a sub-region in which the position of the light-incident-side lens apex is displaced from a position of a light-exit-side lens apex of the unit lens among the plurality of sub-regions, eccentric directions of the unit lenses adjacent to each other are opposite to each other, the eccentric direction being a displacement direction of the light-incident side lens apex with respect to the position of the light-exit-side lens apex.

[14] The illumination device according to [13], in which light beams having passed through the light-incident-side lens apexes of the unit lenses in the plurality of sub-regions reach positions different from one another on an irradiated surface.

[15] The illumination device according to [13] or [14], in which light beams having passed through light-incident positions facing the light-exit-side lens apexes of the unit lenses in the plurality of sub-regions reach a same position on an irradiated surface.

[16] The illumination device according to any of [13] to [15], in which the first uniformization optical member is configured of a fly-eye lens.

[17] The illumination device according to any one of [13] to [16], further including a second uniformization optical member on an optical path between the light source section and the first uniformization optical member.

[18] A display unit including:
an illumination device emitting illumination light; and
a light modulation device modulating the illumination light, based on an image signal,
in which the illumination device includes
a light source section, and
a first uniformization optical member including a plurality of unit lenses that are two-dimensionally arranged, and allowing light from the light source section to pass therethrough,
a light passing surface of the first uniformization optical member is divided into a plurality of sub-regions, and a position of a light-incident-side lens apex of the unit lens is different for each of the plurality of sub-regions, and
in a sub-region in which the position of the light-incident-side lens apex is displaced from a position of a light-exit-side lens apex of the unit lens among the plurality of sub-regions, eccentric directions of the unit lenses adjacent to each other are opposite to each other, the eccentric direction being a displacement direction of the light-incident side lens apex with respect to the position of the light-exit-side lens apex.

[19] The display unit according to [18], further including a projection optical system projecting the illumination light modulated by the light modulation device onto a projection surface.

[20] The display unit according to [18] or [19], in which the light modulation device is a liquid crystal device.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST 1, 1A to 1D illumination device
11R red laser
11G green laser
11B blue laser
12R, 12G, 12B coupling lens
131, 132 dichroic prism
14 optical device
140 drive section
15, 15A to 15C, 151, 152 fly-eye lens
161, 162 sub-condenser lens
17 condenser lens
21 reflective liquid crystal device
22 field lens
23 polarization beam splitter
24 projection lens
3, 3A to 3D display unit
30 screen
Z0 optical axis
Sin light-incident surface
Sout light-exit surface
A11 to A14, A21 to A24, A31 to A35 sub-region
UL11 to UL14, UL21 to UL24, UL31 to UL35 unit lens
Pc central point
w, w1 to w4 arrangement pitch in horizontal direction
d, d1 to d4 thickness in the optical-axis direction
Pin light-incident-side lens apex
Pout light-exit-side lens apex
p arrangement pitch in vertical direction

The invention claimed is:

1. An optical member comprising:
a substrate; and
a plurality of sub-regions two-dimensionally arranged on the substrate, each of the sub-regions including a plurality of unit lenses,
wherein the sub-regions and unit lenses are configured to spatially divide an incident light flux from a light source into a plurality of light fluxes according to the arrangement of the sub-regions while partially superimposing said divided light fluxes onto one another,
wherein each of the sub-regions includes a plurality of the unit lenses arranged in a two-dimensional array, and each of the unit lenses has shape anisotropy,
wherein widths of the unit lenses between each sub-region are different and the unit lenses have same width and same length within each sub-region and the width is longer than the length within each sub-region,
wherein within each sub-region, arrangement pitches of the unit lenses at a peripheral portion of the optical member are same as arrangement pitches at a center portion of the optical member, and
wherein when the number of sub-regions is N, an arrangement pitch of a unit lens in an nth (n=2, . . . , or N) sub-region is $w_n$, and an arrangement pitch of a unit lens in an adjacent (n−1)th sub-region is $w_{(n-1)}$ satisfy the following relationship $$W_{n-1} \times \frac{\left(\frac{h_{(n-1)1} + 3h_{(n-1)2}}{4}\right)}{h_{(n-1)1}} < W_n < W_{n-1} \times \frac{\left(\frac{3h_{(n-1)1} + h_{(n-1)2}}{4}\right)}{h_{(n-1)1}} \quad (3)$$

wherein N is a natural number of 2 or larger, $h_{(n-1)1}$ is an interval between a first peak portions having a maximum light amount in a light amount distribution of an illumination region on a reflective liquid crystal device for the respective sub-region, and $h_{(n-1)2}$ is an interval between a second peak portions lower than the first peak portions in the light amount distribution on the reflective liquid crystal device for the respective sub-region.

2. The optical member according to claim 1, wherein the divided light fluxes of the respective sub-areas are superimposed to at least partially cancel a diffraction unevenness of the light fluxes of adjacent sub-regions.

3. The optical member according to claim 1, wherein the sub-regions are arranged point-symmetrically with respect to a central point of a light incident surface of the optical member.

4. The optical member according to claim 1, wherein thicknesses of the unit lenses in an optical-axis direction differ with respect to each of the sub-regions.

5. The optical member according to claim 4, wherein when the number of sub-regions is N, a thickness in the optical-axis direction of a unit lens in an nth (n=2, ..., or N) sub-region is $d_n$, and a thickness in the optical-axis direction of an unit lens in an adjacent (n−1)th sub-region is $d_{(n-1)}$ satisfy the following relationship $$d_{n-1} \times \frac{\left(\frac{h_{(n-1)1} + 3h_{(n-1)2}}{4}\right)}{h_{(n-1)1}} \times \alpha < d_n < d_{n-1} \times \frac{\left(\frac{3h_{(n-1)1} + h_{(n-1)2}}{4}\right)}{h_{(n-1)1}} \times \alpha \quad (8)$$

wherein N is a natural number of 2 or larger, wherein alpha ($\alpha$) is a coefficient value representing a change in magnification, $h_{(n-1)1}$ is an interval between a first peak portions having a maximum light amount in a light amount distribution of an illumination region on a reflective liquid crystal device for the respective sub-region, and $h_{(n-1)2}$ is an interval between a second peak portions lower than the first peak portions in the light amount distribution on the reflective liquid crystal device for the respective sub-region.

6. An illumination device comprising:
a light source section; and
an optical member configured to receive light from the light source section, the optical member including
a substrate, and
a plurality of sub-regions two-dimensionally arranged on the substrate, each of the sub-regions including a plurality of unit lenses,
wherein the sub-regions and unit lenses are configured to spatially divide an incident light flux into a plurality of light fluxes according to the arrangement of the sub-regions while partially superimposing said divided light fluxes onto one another,
wherein each of the sub-regions includes a plurality of the unit lenses arranged in a two-dimensional array, and each of the unit lenses has shape anisotropy,
wherein widths of the unit lenses between each sub-region are different and the unit lenses have same width and same length within each sub-region and the width is longer than the length within each sub-region,
wherein within each sub-region, arrangement pitches of the unit lenses at a peripheral portion of the optical member are same as arrangement pitches at a center portion of the optical member, and
wherein when the number of sub-regions is N, an arrangement pitch of a unit lens in an nth (n=2, ..., or N) sub-region is $w_n$, and an arrangement pitch of a unit lens in an adjacent (n−1)th sub-region is $w_{(n-1)}$ satisfy the following relationship $$W_{n-1} \times \frac{\left(\frac{h_{(n-1)1} + 3h_{(n-1)2}}{4}\right)}{h_{(n-1)1}} < W_n < W_{n-1} \times \frac{\left(\frac{3h_{(n-1)1} + h_{(n-1)2}}{4}\right)}{h_{(n-1)1}} \quad (3)$$

wherein N is a natural number of 2 or larger, $h_{(n-1)1}$ is an interval between a first peak portions having a maximum light amount in a light amount distribution of an illumination region on a reflective liquid crystal device for the respective sub-region, and $h_{(n-1)2}$ is an interval between a second peak portions lower than the first peak portions in the light amount distribution on the reflective liquid crystal device for the respective sub-region.

7. The illumination device according to claim 6, wherein the divided light fluxes of the respective sub-areas are superimposed to at least partially cancel a diffraction unevenness of the light fluxes of adjacent sub-regions.

8. The illumination device according to claim 6, wherein the sub-regions are arranged point-symmetrically with respect to a central point of a light incident surface of the optical member.

9. The illumination device according to claim 6, wherein thicknesses of the unit lenses in an optical-axis direction differ with respect to each of the sub-regions.

10. The illumination device according to claim 9, wherein when the number of sub-regions is N, a thickness in the optical-axis direction of a unit lens in an nth (n=2, ..., or N) sub-region is $d_n$, and a thickness in the optical-axis direction of an unit lens in an adjacent (n−1)th sub-region is $d_{(n-1)}$ satisfy the following relationship $$d_{n-1} \times \frac{\left(\frac{h_{(n-1)1} + 3h_{(n-1)2}}{4}\right)}{h_{(n-1)1}} \times \alpha < d_n < d_{n-1} \times \frac{\left(\frac{3h_{(n-1)1} + h_{(n-1)2}}{4}\right)}{h_{(n-1)1}} \times \alpha \quad (8)$$

wherein N is a natural number of 2 or larger, wherein alpha ($\alpha$) is a coefficient value representing a change in magnification, $h_{(n-1)1}$ is an interval between a first peak portions having a maximum light amount in a light amount distribution of an illumination region on a reflective liquid crystal device for the respective sub-region, and $h_{(n-1)2}$ is an interval between a second peak portions lower than the first peak portions in the light amount distribution on the reflective liquid crystal device for the respective sub-region.

11. A display apparatus comprising:
an illumination device including a light source and an optical member, the optical member including a substrate, and
a plurality of sub-regions two-dimensionally arranged on the substrate, each of the sub-regions including a plurality of unit lenses; and a display optical system for displaying an image with light emitted from the illumination device, wherein the sub-regions and unit lenses are configured to spatially divide an incident light flux into a plurality of light fluxes according to the arrangement of the sub-regions while partially superimposing said divided light fluxes onto one another, wherein each of the sub-regions includes a plurality of the unit lenses arranged in a two-dimensional array, and each of the unit lenses has shape anisotropy, wherein widths of the unit lenses between each sub-region are different and the unit lenses have same width and same length within each sub-region and the width is longer than the length within each sub-region, wherein within each sub-region, arrangement pitches of the unit lenses at a peripheral portion of the optical member are same as arrangement pitches at a center portion of the optical member, and wherein when the number of sub-regions is N, an arrangement pitch of a unit lens in an nth (n=2, . . . , or N) sub-region is $w_n$, and an arrangement pitch of a unit lens in an adjacent (n−1)th sub-region is $w_{(n-1)}$ satisfy the following relationship $$w_{n-1} \times \frac{\left(\frac{h_{(n-1)1} + 3h_{(n-1)2}}{4}\right)}{h_{(n-1)1}} < w_n < w_{n-1} \times \frac{\left(\frac{3h_{(n-1)1} + h_{(n-1)2}}{4}\right)}{h_{(n-1)1}} \quad (3)$$

wherein N is a natural number of 2 or larger, $h_{(n-1)1}$ is an interval between a first peak portions having a maximum light amount in a light amount distribution of an illumination region on a reflective liquid crystal device for the respective sub-region, and $h_{(n-1)2}$ is an interval between a second peak portions lower than the first peak portions in the light amount distribution on the reflective liquid crystal device for the respective sub-region.

12. The display apparatus according to claim 11, wherein the divided light fluxes of the respective sub-areas are superimposed to at least partially cancel a diffraction unevenness of the light fluxes of adjacent sub-regions.

13. The display apparatus according to claim 11, wherein the sub-regions are arranged point-symmetrically with respect to a central point of a light incident surface of the optical member.

14. The display apparatus according to claim 11, wherein thicknesses of the unit lenses in an optical-axis direction differ with respect to each of the sub-regions.

15. The display apparatus according to claim 14, wherein when the number of sub-regions is N, a thickness in the optical-axis direction of a unit lens in an nth (n=2, . . . , or N) sub-region is $d_n$ and a thickness in the optical-axis direction of an unit lens in an adjacent (n−1)th sub-region is $d_{(n-1)}$ satisfy the following relationship $$d_{n-1} \times \frac{\left(\frac{h_{(n-1)1} + 3h_{(n-1)2}}{4}\right)}{h_{(n-1)1}} \times \alpha < d_n < d_{n-1} \times \frac{\left(\frac{3h_{(n-1)1} + h_{(n-1)2}}{4}\right)}{h_{(n-1)1}} \times \alpha \quad (8)$$

wherein N is a natural number of 2 or larger, wherein alpha ($\alpha$) is a coefficient value representing a change in magnification, $h_{(n-1)1}$ is an interval between a first peak portions having a maximum light amount in a light amount distribution of an illumination region on a reflective liquid crystal device for the respective sub-region, and $h_{(n-1)2}$ is an interval between a second peak portions lower than the first peak portions in the light amount distribution on the reflective liquid crystal device for the respective sub-region.

16. An optical member comprising:

a substrate; and a plurality of sub-regions two-dimensionally arranged on the substrate, each of the sub-regions including a plurality of unit lenses, wherein the sub-regions and unit lenses are configured to spatially divide an incident light flux from a light source into a plurality of light fluxes according to the arrangement of the sub-regions while partially superimposing said divided light fluxes onto one another, wherein each of the sub-regions includes a plurality of the unit lenses arranged in a two-dimensional array, and each of the unit lenses has shape anisotropy, wherein widths of the unit lenses between each sub-region are different and the unit lenses have same width and same length within each sub-region and the width is longer than the length within each sub-region, wherein within each sub-region, arrangement pitches of the unit lenses at a peripheral portion of the optical member are same as arrangement pitches at a center portion of the optical member, wherein thicknesses of the unit lenses in an optical-axis direction differ with respect to each of the sub-regions, and wherein when the number of sub-regions is N, a thickness in the optical-axis direction of a unit lens in an nth (n=2, . . . , or N) sub-region is $d_n$, and a thickness in the optical-axis direction of an unit lens in an adjacent (n−1)th sub-region is $d_{(n-1)}$ satisfy the following relationship $$d_{n-1} \times \frac{\left(\frac{h_{(n-1)1} + 3h_{(n-1)2}}{4}\right)}{h_{(n-1)1}} \times \alpha < d_n < d_{n-1} \times \frac{\left(\frac{3h_{(n-1)1} + h_{(n-1)2}}{4}\right)}{h_{(n-1)1}} \times \alpha \quad (8)$$

wherein N is a natural number of 2 or larger, wherein alpha ($\alpha$) is a coefficient value representing a change in magnification, $h_{(n-1)1}$ is an interval between a first peak portions having a maximum light amount in a light amount distribution of an illumination region on a reflective liquid crystal device for the respective sub-region, and $h_{(n-1)2}$ is an interval between a second peak portions lower than the first peak portions in the light amount distribution on the reflective liquid crystal device for the respective sub-region.

17. An illumination device comprising a light source section, and the optical member according to claim 16.

18. A display apparatus comprising a light source and the optical member according to claim 16.

* * * * *